US012654158B2

(12) United States Patent
Banba et al.

(10) Patent No.: US 12,654,158 B2
(45) **Date of Patent: \*Jun. 16, 2026**

(54) CATALYST STRUCTURE FOR SYNTHESIS GAS PRODUCTION, SYNTHESIS GAS PRODUCTION APPARATUS, AND METHOD FOR PRODUCING CATALYST STRUCTURE FOR SYNTHESIS GAS PRODUCTION

(71) Applicants: FURUKAWA ELECTRIC CO., LTD., Tokyo (JP); NATIONAL UNIVERSITY CORPORATION HOKKAIDO UNIVERSITY, Sapporo (JP)

(72) Inventors: Yuichiro Banba, Tokyo (JP); Masayuki Fukushima, Tokyo (JP); Takahiro Ueno, Tokyo (JP); Tomohiko Mori, Tokyo (JP); Mai Nishii, Tokyo (JP); Takao Masuda, Sapporo (JP); Yuta Nakasaka, Sapporo (JP); Takuya Yoshikawa, Sapporo (JP)

(73) Assignees: FURUKAWA ELECTRIC CO., LTD., Tokyo (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 382 days.

This patent is subject to a terminal disclaimer.

(21) Appl. No.: 18/000,459

(22) PCT Filed: Jun. 1, 2021

(86) PCT No.: PCT/JP2021/020803
§ 371 (c)(1),
(2) Date: Dec. 1, 2022

(87) PCT Pub. No.: WO2021/246394
PCT Pub. Date: Dec. 9, 2021

(65) Prior Publication Data
US 2023/0211325 A1      Jul. 6, 2023

(30) Foreign Application Priority Data

Jun. 1, 2020    (JP) ................................. 2020-095652

(51) Int. Cl.
*B01J 29/035*          (2006.01)
*B01J 23/89*           (2006.01)
                       (Continued)

(52) U.S. Cl.
CPC ......... *B01J 29/0356* (2013.01); *B01J 23/892* (2013.01); *B01J 35/394* (2024.01);
                       (Continued)

(58) Field of Classification Search
None
See application file for complete search history.

(56) References Cited

U.S. PATENT DOCUMENTS 11,161,101 B2    11/2021    Kato
11,547,987 B2     1/2023    Masuda
                 (Continued)

FOREIGN PATENT DOCUMENTS

CN        110678261 A      1/2020
CN        113164937 A      7/2021
                  (Continued)

OTHER PUBLICATIONS

Extended European Search Report issued May 22, 2024 in European Patent Application No. 21818874.6, 8 pages.
(Continued)

*Primary Examiner* — Keling Zhang
*Assistant Examiner* — Jialan Zhang
(74) *Attorney, Agent, or Firm* — Oblon, McClelland, Maier & Neustadt, L.L.P.

(57)            ABSTRACT

A catalyst structure for synthesis gas production of a synthesis gas that contains carbon monoxide and hydrogen, the catalyst structure being provided with a carrier that has a porous structure, while being configured from a zeolite type
(Continued)

compound; first catalyst particles that contain one or more iron group elements which are selected from the group consisting of nickel (Ni), iron (Fe) and cobalt (Co); and second catalyst particles that contain one or more platinum group elements which are selected from the group consisting of platinum (Pt), palladium (Pd), rhodium (Rh) and ruthenium (Ru). The catalyst structure for synthesis gas production has passages in communication with each other within the carrier. The first catalyst particles are present at least in the passages of the carrier; and the second catalyst particles are present at least either inside the carrier or on the outer surface of the carrier.

20 Claims, 7 Drawing Sheets

(51) Int. Cl.

| | |
|---|---|
| *B01J 35/30* | (2024.01) |
| *B01J 35/40* | (2024.01) |
| *B01J 35/45* | (2024.01) |
| *B01J 35/64* | (2024.01) |
| *B01J 37/02* | (2006.01) |
| *B01J 37/08* | (2006.01) |
| *B01J 37/16* | (2006.01) |
| *C01B 3/40* | (2006.01) |

(52) U.S. Cl.
CPC ............. *B01J 35/45* (2024.01); *B01J 35/647* (2024.01); *B01J 37/0205* (2013.01); *B01J 37/0207* (2013.01); *B01J 37/024* (2013.01); *B01J 37/088* (2013.01); *B01J 37/16* (2013.01); *C01B 3/40* (2013.01); *B01J 35/40* (2024.01); *B01J 2235/00* (2024.01); *B01J 2235/15* (2024.01); *B01J 2235/30* (2024.01); *C01B 2203/0238* (2013.01); *C01B 2203/107* (2013.01); *C01B 2203/1082* (2013.01)

(56) References Cited

U.S. PATENT DOCUMENTS

| | | | |
|---|---|---|---|
| 11,648,538 | B2 | 5/2023 | Masuda |
| 11,648,542 | B2 | 5/2023 | Masuda |
| 11,648,543 | B2 | 5/2023 | Masuda |
| 11,654,422 | B2 | 5/2023 | Masuda |
| 11,655,157 | B2 | 5/2023 | Masuda |
| 11,666,894 | B2 | 6/2023 | Masuda |
| 11,680,211 | B2 | 6/2023 | Masuda |
| 11,684,909 | B2 | 6/2023 | Masuda |
| 2017/0354962 | A1 | 12/2017 | D'Souza et al. |
| 2018/0311651 | A1* | 11/2018 | Ravon ..................... B01J 35/23 |
| 2022/0023848 | A1 | 1/2022 | Nakai et al. |

FOREIGN PATENT DOCUMENTS

| | | | |
|---|---|---|---|
| EP | 3 632 544 | A1 | 4/2020 |
| EP | 3 892 373 | A1 | 10/2021 |
| JP | 11-47607 | A | 2/1999 |
| JP | 2013-255911 | A | 12/2013 |
| JP | 2014-200705 | A | 10/2014 |
| JP | 2016-2527 | A | 1/2016 |
| WO | WO 2018/221697 | A1 | 12/2018 |
| WO | WO 2020/116477 | A1 | 6/2020 |

OTHER PUBLICATIONS

Liu, D., et al., "A Comparative Study on Catalyst Deactivation of Nickel and Cobalt Incorporated MCM-41 Catalysts Modified by Platinum in Methane Reforming with Carbon Dioxide", Catalysis Today, vol. 154, No. 3-4, Sep. 15, 2010, XP027197218, pp. 229-236.
Combined Chinese Office Action and Search Report issued Dec. 6, 2023 in Chinese Application 202180039480.0, (with English translation), 28 pages.
U.S. Appl. No. 17/299,609, filed Jun. 3, 2021, Mai Nishii.
U.S. Appl. No. 17/299,718, filed Jun. 3, 2021, Mai Nishii.
U.S. Appl. No. 17/299,641, filed Feb. 10, 2022, Yuichiro Banba.
U.S. Appl. No. 17/167,280, filed Feb. 4, 2021, Sadahiro Kato.
U.S. Appl. No. 17/930,056, filed Sep. 6, 2022, Takao Masuda.
U.S. Appl. No. 18/171,140, filed Feb. 17, 2023, Takao Masuda.
U.S. Appl. No. 16/698,496, filed Nov. 27, 2019, Takao Masuda.
U.S. Appl. No. 17/299,639, filed Feb. 10, 2022, Yuichiro Banba.
U.S. Appl. No. 17/299,646, filed Jun. 3, 2021, Yukako Nakai.
U.S. Appl. No. 17/299,672, filed Jun. 3, 2021, Mai Nishii.
U.S. Appl. No. 17/299,748, filed Jun. 3, 2021, Kaori Sekine.
U.S. Appl. No. 18/000,459, filed Dec. 1, 2022, Yuichiro Banba.
U.S. Appl. No. 16/698,567, filed Nov. 27, 2019, Takao Masuda.
U.S. Appl. No. 16/698,545, filed Nov. 27, 2019.
International Search Report issued Jul. 13, 2021 in PCT/JP2021/020803 filed on Jun. 1, 2021, 3 pages.

* cited by examiner

CATALYST STRUCTURE FOR SYNTHESIS GAS PRODUCTION, SYNTHESIS GAS PRODUCTION APPARATUS, AND METHOD FOR PRODUCING CATALYST STRUCTURE FOR SYNTHESIS GAS PRODUCTION

PARTIES TO A JOINT RESEARCH AGREEMENT

The presently claimed invention was made by or on behalf of the below listed parties to a joint research agreement. The joint research agreement was in effect on or before the effective filing date of the claimed invention, and the claimed invention was made as a result of activities undertaken with the scope of the joint research agreement. The parties to the joint research agreement are FURUKAWA ELECTRIC CO. LTD. and NATIONAL UNIVERSITY CORPORATION HOKKAIDO UNIVERSITY.

TECHNICAL FIELD

The present invention relates to a catalyst structure for use in syngas production, a syngas production system, and a method for producing a catalyst structure for use in syngas production. More specifically, the present invention relates to: a catalyst structure that has long-term stability and is useful for catalytically producing a syngas including carbon monoxide and hydrogen from a methane-containing gas and carbon dioxide; a syngas production system including such a catalyst structure for use in syngas production; and a method for producing such a catalyst structure for use in syngas production.

BACKGROUND ART

In recent years, a technology for catalytically converting carbon dioxide and methane, which are causes of global warming, into a syngas including carbon monoxide and hydrogen (dry reforming) has attracted attention as a countermeasure against global warming.

For example, Patent Document 1 discloses a catalyst for use in such syngas production, including: a support including an oxygen-deficient perovskite complex oxide containing Mn and a specific alkaline-earth metal; and a supported metal including nickel.

The reaction for catalytic conversion of carbon dioxide and methane into a syngas including carbon monoxide and hydrogen must be carried out at a temperature as high as 800° C. or more. Unfortunately, in the catalyst disclosed in Patent Document 1, which includes a support and a catalyst metal supported on the outer surface of the support, the catalyst particles tend to aggregate together at high temperature or tend to undergo degradation in catalytic activity due to carbon deposition (coking) thereon.

For example, Patent Document 2 discloses a method for reducing aggregation and bonding between catalyst particles and for increasing the specific surface area of the catalyst particles, which includes fixing the catalyst particles onto the surface of a base material; and then subjecting the catalyst particles to oxidation and reduction under specific conditions. Patent Document 3 discloses a catalyst for use in dry reforming, which includes a complex oxide and Ni supported on the complex oxide.

Patent Document 1: Japanese Unexamined Patent Application, Publication No. 2013-255911
Patent Document 2: Japanese Unexamined Patent Application, Publication No. 2016-2527

Patent Document 3: Japanese Unexamined Patent Application, Publication No. 2014-200705

DISCLOSURE OF THE INVENTION

Problems to be Solved by the Invention

Unfortunately, a decrease in catalytic activity easily occurs in dry reforming, and its tendency to form carbon deposition on the catalyst surface (coking) is known as a cause of the decrease in catalytic activity. Specifically, dry reforming tends to suffer from the problem of the clogging of the catalyst-filled reaction tube by coking since it uses a raw material gas with a carbon content higher than that for steam reforming in which methane reacts with water vapor. In this regard, a Ni-supported catalyst, such as that disclosed in Patent Document 3, tends to suffer from coking and can hardly maintain its catalytic activity although it has high activity among base metal-based catalysts.

In this regard, the inventors have previously found that a catalyst structure including: a support including, for example, zeolite; and a metal catalyst incorporated in the support exhibits both high catalytic activity and high coking resistance when used for dry reforming (see PCT/JP2019/047296). In particular, such a catalyst structure is less prone to coking on the metal catalyst inside the support and thus can maintain its catalytic activity for a long period of time.

However, a new mode of catalyst degradation has been found as a result of achievement of long-term maintenance of catalytic activity by the decrease of coking. According to the new mode of degradation, the catalytic activity gradually decreases, which is a tendency different from that of a rapid decrease in catalytic activity due to coking.

It is an object of the present invention to provide a catalyst structure that can maintain high catalytic activity for a longer period of time and is useful for efficient production of a syngas including carbon monoxide and hydrogen, to provide a syngas production system, and to provide a method of producing such a catalyst structure for use in syngas production.

Means for Solving the Problems

As a result of intensive studies for achieving the object, the inventors have created a catalyst structure including: a support including a zeolite-type compound and having a porous structure; first catalyst particles including an iron group element; and second catalyst particles including a platinum group element, in which the support has, in its interior, channels communicating with one another, the first catalyst particles are present at least in the channels of the support, and the second catalyst particles are present at least either inside the support or on the outer surface of the support, and have found that when the catalyst structure having such features is used for dry reforming to produce carbon monoxide and hydrogen, the first catalyst particles are less likely to suffer from carbon deposition (coking) and the first catalyst particles present inside the support are less likely to undergo oxidation. Thus, the inventors have found that the catalyst structure having such features can maintain high catalytic activity for a longer period of time and enables efficient production of a syngas including carbon monoxide and hydrogen, and have completed the present invention based on the findings.

Specifically, the present invention has the following principal features.

(1) A syngas production catalyst structure for use in production of a syngas including carbon monoxide and hydrogen, the syngas production catalyst structure including: a support including a zeolite-type compound and having a porous structure; first catalyst particles including at least one iron group element selected from the group consisting of nickel (Ni), iron (Fe), and cobalt (Co); and second catalyst particles including at least one platinum group element selected from the group consisting of platinum (Pt), palladium (Pd), rhodium (Rh), and ruthenium (Ru), wherein the support has, in its interior, channels communicating with one another, the first catalyst particles are present at least in the channels of the support, and the second catalyst particles are present at least either inside the support or on the outer surface of the support.

(2) The syngas production catalyst structure according to aspect (1), wherein the iron group element is nickel (Ni).

(3) The syngas production catalyst structure according to aspect (1) or (2), wherein a total content of the first catalyst particles is 0.5% by mass or more and 3.5% by mass or less with respect to the mass of the syngas production catalyst structure.

(4) The syngas production catalyst structure according to any one of aspects (1) to (3), wherein the first catalyst particles have an average particle size larger than the average inner diameter of the channels.

(5) The syngas production catalyst structure according to any one of aspects (1) to (4), wherein the first catalyst particles have an average particle size in the range of 1.0 nm or more and 13.0 nm or less.

(6) The syngas production catalyst structure according to any one of aspects (1) to (5), wherein the ratio of the average particle size of the first catalyst particles to the average inner diameter of the channels is in the range of more than 1 and 130 or less.

(7) The syngas production catalyst structure according to any one of aspects (1) to (6), wherein a total content of the second catalyst particles is 0.02% by mass or more and 6.00% by mass or less with respect to the mass of the syngas production catalyst structure.

(8) The syngas production catalyst structure according to any one of aspects (1) to (7), wherein the second catalyst particles are present on the outer surface of the support, and the second catalyst particles present on the outer surface of the support have an average particles size in the range of 1 nm or more and 100 nm or less.

(9) The syngas production catalyst structure according to any one of aspects (1) to (8), wherein the second catalyst particles are present inside the support, and the second catalyst particles present inside the support have an average particle size larger than the average inner diameter of the channels.

(10) The syngas production catalyst structure according to any one of aspects (1) to (9), wherein the second catalyst particles are present inside the support, and the second catalyst particles present inside the support have an average particle size in the range of 0.3 nm or more and 13.0 nm or less.

(11) The syngas production catalyst structure according to any one of aspects (1) to (10), wherein the channels have: any one selected from a one-dimensional pore, a two-dimensional pore, and a three-dimensional pore of a framework structure of the zeolite-type compound; and enlarged pore portions different from all of the one-, two-, and three-dimensional pores, and among the first and second catalyst particles, at least the first catalyst particles are present in the enlarged pore portions.

4

(12) The syngas production catalyst structure according to aspect (11), wherein the first and second catalyst particles are present in the enlarged pore portions.

(13) The syngas production catalyst structure according to aspect (11) or (12), wherein the enlarged pore portions connect a plurality of pores constituting one selected from the one-, two-, and three-dimensional pores.

(14) The syngas production catalyst structure according to any one of aspects (11) to (13), wherein the first and second catalyst particles present inside the support have an average particle size smaller than or equal to the inner diameters of the enlarged pore portions.

(15) The syngas production catalyst structure according to any one of aspects (1) to (14), wherein all of the first and second catalyst particles are metal fine particles.

(16) The syngas production catalyst structure according to any one of aspects (1) to (15), further including at least one type of additional catalyst particles that are other than the first and second catalyst particles and supported on the outer surface of the support.

(17) The syngas production catalyst structure according to aspect (16), wherein the total content of the first and second catalyst particles present inside the support is higher than that of the additional catalyst particles.

(18) The syngas production catalyst structure according to any one of aspects (1) to (17), wherein the zeolite-type compound is a silicate compound.

(19) The syngas production catalyst structure according to any one of aspects (1) to (18), wherein the syngas production catalyst structure is capable of exhibiting a $CH_4$ conversion rate of 60% or more when loaded in an atmospheric pressure flow reactor, supplied with a raw material gas with a $CH_4/CO_2$ volume ratio of 1.0, and used to perform a dry reforming reaction at 700° C. and a gas hourly space velocity (GHSV) of 320 $h^{-1}$ for 100 hours from the start of supply of the raw material gas.

(20) A precursor of the syngas production catalyst structure according to any one of aspects (1) to (19), the precursor including metal oxide fine particles as a precursor of at least one selected from the first and second catalyst particles.

(21) A syngas production system including: the syngas production catalyst structure according to any one of aspects (1) to (19) or the precursor according to aspect (20).

(22) A method of producing a catalyst structure for use in syngas production, the method including: a first firing step that includes firing a precursor material (B) including an iron group element-containing solution and a precursor material (A) for obtaining a support having a porous structure and comprising a zeolite-type compound, the precursor material (A) having pores with a size of 13.0 nm or less and being impregnated with the iron group element-containing solution; a hydrothermal treatment step that includes hydrothermally treating a precursor material (C) obtained by firing the precursor material (B); a step that includes impregnating, with a platinum group element-containing solution, a precursor material (D) obtained by hydrothermally treating the precursor material (C); and a second firing step that includes firing the precursor material (D) impregnated with the platinum group element-containing solution, wherein the iron group element is at least one selected from the group consisting of nickel (Ni), iron (Fe), and cobalt (Co), and the platinum group element is at least one selected from the group consisting of platinum (Pt), palladium (Pd), rhodium (Rh), and ruthenium (Ru).

(23) The method according to aspect (22), further including a step that includes subjecting, to reduction treatment, a product resulting from the firing of the precursor material (D) in the second firing step.

(24) A method of producing a catalyst structure for use in syngas production, the method including: a first firing step that includes firing a precursor material (B) including a metal-containing solution and a precursor material (A), the metal-containing solution containing an iron group element and a platinum group element, the precursor material (A) being for obtaining a support having a porous structure and comprising a zeolite-type compound, the precursor material (A) having pores with a size of 13.0 nm or less and being impregnated with the metal-containing solution; and a hydrothermal treatment step that includes hydrothermally treating a precursor material (C) obtained by firing the precursor material (B), wherein the iron group element is at least one selected from the group consisting of nickel (Ni), iron (Fe), and cobalt (Co), and the platinum group element is at least one selected from the group consisting of platinum (Pt), palladium (Pd), rhodium (Rh), and ruthenium (Ru).

(25) The method according to any one of aspects (22) to (24), further including adding a nonionic surfactant to the precursor material (A) before the first firing step, wherein the nonionic surfactant is present in an amount of 50% by mass or more and 500% by mass or less with respect to the mass of the precursor material (A).

(26) The method according to any one of aspects (22) to (25), wherein before the first firing step, the precursor material (A) is impregnated with the iron group element-containing solution or the metal-containing solution by adding the iron group element- or metal-containing solution in two or more divided portions to the precursor material (A).

(27) The method according to any one of aspects (22) to (26), wherein before the first firing step, the precursor material (A) is impregnated with the iron group element-containing solution or the metal-containing solution by adding, to the precursor material (A), the iron group element- or metal-containing solution in such an amount that the ratio (atomic ratio $Si/M_1$) of the number of silicon (Si) atoms in the precursor material (A) to the number of atoms of the iron group element ($M_1$) in the iron group element- or metal-containing solution falls within the range of 10 or more and 1,000 or less.

(28) The method according to any one of aspects (22) to (27), wherein the ratio of the content of the platinum group element ($M_2$) in the platinum group element- or metal-containing solution to the content of the iron group element ($M_1$) in the iron group element- or metal-containing solution (mass content ratio $M_2/M_1$) is in the range of 0.05 or more and 3 or less.

The method according to any one of aspects (22) to (28), wherein the hydrothermal treatment step includes mixing the precursor material (C) with a structure-directing agent.

Effects of the Invention

The present invention provides: a syngas production catalyst structure that can maintain high catalytic activity for a longer period of time and is useful for efficient production of a syngas including carbon monoxide and hydrogen; a syngas production system; and a method of producing such a syngas production catalyst structure.

BRIEF DESCRIPTION OF THE DRAWINGS

FIGS. 1A and 1B are schematic views of the inner structure of a catalyst structure according to an embodiment of the present invention, in which FIG. 1A is a perspective view (partially cross-sectional), and FIG. 1B is a partially enlarged cross-sectional view;

FIGS. 2A and 2B are partially enlarged cross-sectional views for showing an example of the function of the catalyst structure of FIGS. 1A and 1B, in which FIG. 2A is a view for showing a sieving function, and FIG. 2B is a view for showing a catalytic ability;

FIGS. 3A and 3B are schematic views of the inner structure of a catalyst structure according to a first modification of an embodiment of the present invention, in which FIG. 3A is a perspective view (partially cross-sectional), and FIG. 3B is a partially enlarged cross-sectional view;

PREFERRED MODE FOR CARRYING OUT THE INVENTION

Hereinafter, embodiments of the present invention will be described in detail with reference to the drawings.

Features of Catalyst Structure

Figure 1A:
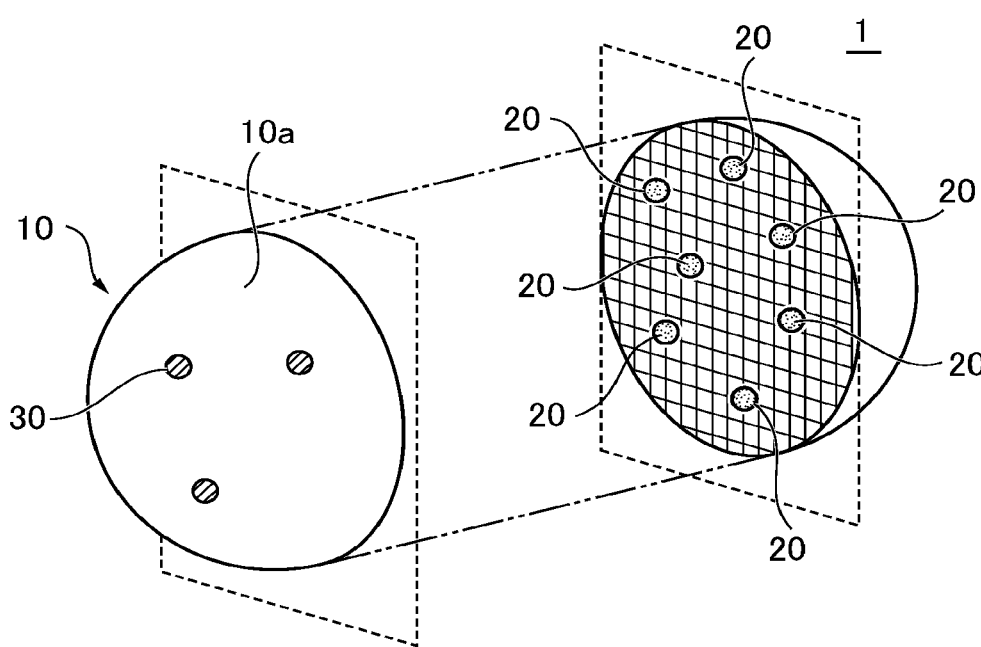
Figure 1B:
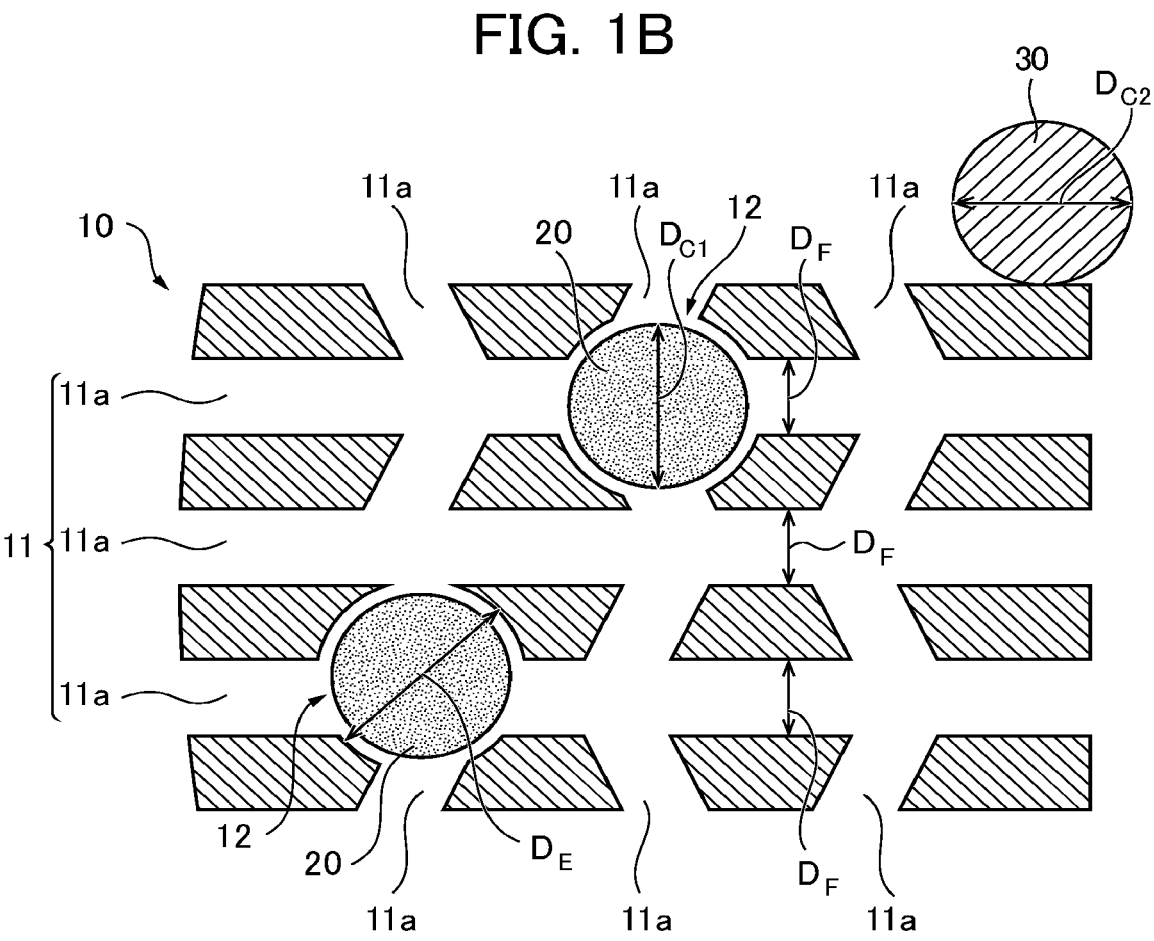

FIGS. 1A and 1B schematically show the features of a catalyst structure for use in syngas production according to an embodiment of the present invention (hereinafter simply referred to as "the catalyst structure"), in which FIG. 1A is a perspective view (partially cross-sectional), and FIG. 1B is a partially enlarged cross-sectional view. It should be noted that FIGS. 1A and 1B show only an example of the catalyst structure and the features shown in FIGS. 1A and 1B, such as shapes and dimensions, are not intended to limit those of the present invention.

As shown in FIG. 1A, a catalyst structure 1, which is for use in production of a syngas including carbon monoxide and hydrogen, includes: a support 10 including a zeolite-type compound and having a porous structure; first catalyst particles 20 including an iron group element as described later; and second catalyst particles 30 including a platinum group element as described later.

In this regard, the inventors have previously developed a catalyst structure including a support, such as zeolite, and a metal catalyst present inside the support, and found that when used for dry reforming reaction, such a catalyst structure exhibits high coking resistance and maintains high catalytic activity for a long period of time. In order to maintain high catalytic activity for a longer period of time than that of such a catalyst structure, however, there is a need to prevent a decrease in catalytic activity due to some causes other than coking. Now, the inventors have found that the main cause of such a decrease in catalytic activity, other than coking, is that water ($H_2O$) molecules form as a by-product of a reverse shift reaction, which is a side reaction, and oxidize the metal catalyst.

In this regard, the second catalyst particles 30 of the catalyst structure 1 of the present invention allow hydrogen atoms produced during dry reforming reaction to undergo spillover onto the first catalyst particles 20 to prevent oxidation of the first catalyst particles 20. Thus, the catalyst structure 1 of the present invention allows the first catalyst particles 20 to maintain their catalytic activity for a longer period of time.

The catalyst structure 1 has multiple first catalyst particles 20 located at least in channels of the support 10, which communicate with one another. The catalyst structure 1 also has multiple second catalyst particles 30 located at least either inside the support 10 or on the outer surface of the support 10. The first catalyst particle 20, which is in the form of a fine particle, is a catalytic material that exhibits catalytic ability (catalytic activity) at least when the catalyst structure 1 is used as a catalyst. The action of the first and second catalyst particles 20 and 30 will be described in detail later.

Support

The support 10 includes a zeolite-type compound and has a porous structure. As used herein, the term "zeolite-type compound" is intended to include not only crystalline aluminosilicates but also zeolite analogs including phosphate-type porous crystals or other porous crystals having a structure similar to that of crystalline aluminosilicates, as shown in Toyota Central R&D Labs R&D Review, Vol. 29, No. 2, (1994.6). Examples of the zeolite-type compound include silicate compounds, such as zeolite (aluminosilicates), cation-exchanged zeolite, and silicalite; zeolite analogs, such as aluminoborates, aluminoarsenates, and germanates; and phosphate-type zeolite analogs, such as molybdenum phosphate. Among them, the zeolite-type compound is preferably a silicate compound.

Examples of the framework structure of the zeolite-type compound includes, but are not limited to, the framework structures of zeolite compounds approved by the Structure Commission of the International Zeolite Association. In particular, the framework structure of the zeolite-type compound is preferably selected from the group consisting of MTW type, MFI type (ZSM-5), FER type (ferrierite), LTA type (A type), MOR type (mordenite), and LTL type (L type), among which MFI type is more preferred. The MFI-type zeolite is more preferably aluminum (Al)-free Silicalite-1 zeolite. The zeolite-type compound has multiple pores of which the size depends on its framework structure. For example, MFI-type zeolite has a maximum pore size of 0.636 nm (6.36 Å) and an average pore size of 0.560 nm (5.60 Å).

The support 10 has a porous structure. As shown in FIG. 1B, the support 10 has channels 11 communicating with one another, which are preferably formed by multiple pores 11*a*. The first catalyst particles 20 include at least an iron group element described later. The first catalyst particles 20 are present at least in channels 11 of the support 10 and preferably held at least in channels 11 of the support 10. The second catalyst particles 30 include at least a platinum group element described later. The second catalyst particles 30 are present at least either inside the support 10 or on the outer surface of the support 10.

Such a feature restricts the movement of the first catalyst particles 20 in the support 10 and effectively prevents aggregation of first catalyst particles 20 and aggregation of first and second catalyst particles 20 and 30. This is effective in preventing a decrease in the effective surface area of the first catalyst particles 20 when the first catalyst particles 20 are allowed to act as a catalyst for dry reforming reaction to produce carbon monoxide and hydrogen from carbon dioxide and methane. Moreover, the second catalyst particles 30 allow hydrogen atoms produced during dry reforming to undergo spillover onto the first catalyst particles 20 to prevent oxidation of the first catalyst particles 20. Thus, the catalyst structure 1 of the present invention allows the first catalyst particles 20 to maintain their catalytic activity for a long period of time and is less likely to suffer from aggregation or oxidation of the first fine catalyst particles 20 and thus less prone to degradation of catalytic activity. Therefore, the catalyst structure 1 has a long service life. Furthermore, the long service life of the catalyst structure 1 will reduce the frequency of replacement of the catalyst structure 1 and thus significantly reduce the amount of discarded used catalyst structures 1, which will save resources.

The channels 11 preferably have any one selected from a one-dimensional pore, a two-dimensional pore, and a three-dimensional pore, which are defined by the framework structure of the zeolite-type compound, and preferably have enlarged pore portions 12 different from all of the one-, two-, and three-dimensional pores. In this case, among first and second catalyst particles 20 and 30, at least first catalyst particles 20 are each preferably present in the enlarged pore portion 12 and more preferably enclosed in the enlarged pore portion 12. According to this feature, the first catalyst particle 20 present in the enlarged pore portion 12 is further restricted from moving in the support 10, and separation of the first catalyst particle 20, aggregation of first catalyst particles 20, and aggregation of first and second catalyst particles 20 and 30 are more effectively prevented.

In this embodiment, as shown in FIG. 1B, the first catalyst particle 20 is enclosed in the enlarged pore portion 12 of the support 10, and the second catalyst particle 30 is present on the outer surface of the support 10. As used herein, the term "enclosed" means that the first catalyst particle 20 (or the second catalyst particle 30) is included in the support 10 and is not in contact with outside the zeolite except through a regular channel, which is formed during the synthesis of the zeolite. In this regard, the catalyst particle present in the enlarged pore portion 12 (the first catalyst particle 20 in this embodiment) does not always have to be in direct contact with the support 10 and may be indirectly held by the support 10 with an additional material (e.g., a surfactant) provided between the catalyst particle and the support 10.

As used herein, the term "one-dimensional pore" or "one-dimensional pores" refers to a tunnel- or cage-shaped pore constituting a one-dimensional channel or refers to multiple tunnel- or cage-shaped pores constituting multiple one-dimensional channels. The term "two-dimensional pore" refers to a channel having multiple one-dimensional channels connected two-dimensionally. The term "three-dimensional pore" refers to a channel having multiple one-dimensional channels connected three-dimensionally. Thus, the term "enlarged pore portion" is not intended to include a pore expanded to form a regular zeolite structure, such as a supercage.

FIG. 1B shows a case in which the first catalyst particle 20 is enclosed in the enlarged pore portion 12. Such a feature is non-limiting, and alternatively, the first catalyst particle 20 may be held in the channel 11 while partially protruding out of the enlarged pore portion 12. Alternatively, the first catalyst particle 20 may be partially embedded in a portion of the channel 11 other than the enlarged pore portion 12 (e.g., an inner wall portion of the channel 11) or may be held by fixation or the like.

The enlarged pore portion 12 also preferably connects multiple pores 11*a* to one another when the pores 11*a* form any of the one-, two-, and three-dimensional pores. According to this feature, another channel different from the one-, two-, or three-dimensional pore is provided in the support 10 to allow the first and second catalyst particles 20 and 30 to function more effectively.

The channel 11 preferably has a three-dimensional structure including a branching or junction portion inside the support 10, and the enlarged pore portion 12 is preferably provided at the branching or junction portion of the channel 11.

The average inner diameter $D_F$ of the channels 11 provided in the support 10 may be calculated from the average of the short and long diameters of the pores 11a, which form any of the one-, two-, and three-dimensional pores. The average inner diameter $D_F$ of the channels 11 is typically 0.1 nm to 1.5 nm and preferably 0.5 nm to 0.8 nm. The inner diameter $D_E$ of the enlarged pore portion 12 is typically 0.5 nm to 50 nm, preferably 1.1 nm to 40 nm, and more preferably 1.1 nm to 3.3 nm. The inner diameter $D_E$ of the enlarged pore portion 12 depends, for example, on the pore size of the precursor material (A) described later and the size of the first catalyst particle 20 to be enclosed in the enlarged pore portion 12. The inner diameter $D_E$ of the enlarged pore portion 12 is such that it is possible to enclose the catalyst particle 20.

The support 10 may be in any shape. For example, the support 10 may be flat plate-shaped. The flat plate-shaped support 10 preferably has a long side of 1.00 μm or more, more preferably 1.00 μm or more and 50.00 μm or less, and even more preferably 1.00 μm or more and 25.00 μm or less. The flat plate-shaped support 10 preferably has a thickness of 0.05 μm or more and 2.00 μm or less. The flat plate-shaped support 10 has a short side that is along the direction perpendicular to the directions of its long side and its thickness and smaller than its long side and larger than its thickness.

First Catalyst Particle

The first catalyst particle 20 includes at least one iron group element selected from the group consisting of nickel (Ni), iron (Fe), and cobalt (Co). The first catalyst particle 20 alone is in the form of a fine particle. In particular, the iron group element is preferably nickel (Ni) in order for the first catalyst particle 20 to have high catalytic properties.

The first catalyst particle 20 may be a metal fine particle including a single elementary metal, a mixture of two or more metal elements, or a mixture of two or more metal elements at least partially forming an alloy. In this regard, the metal fine particle preferably includes an unoxidized metal. Alternatively, before use, the first catalyst particle 20 may be a metal oxide fine particle including one or more metal oxides or a composite material of metal oxides. Before use, the metal oxide fine particle can be reduced into a metal fine particle for use as a catalyst by being subjected to the reduction step (step S7) described later or by being exposed to an operational environment including a reductive atmosphere for a certain period of time. When used herein to indicate the component (material) of the metal fine particle for use as a catalyst, the term "metal" is a generic term for a metallic material including one or more metal elements, which is intended to include an elementary metal including a single metal element and a metal mixture and alloy including two or more metal elements. The metal fine particle or the metal oxide fine particle may be in the form of a primary particle held in the channel 11 or may be in the form of a secondary particle including an aggregate of primary particles held in the channel 11.

The average particle size $D_{C1}$ of the first catalyst particles 20 is preferably larger than the average inner diameter $D_F$ of the channels 11 ($D_{C1} > D_F$). The average particle size $D_{C1}$ of the first catalyst particles 20 is preferably smaller than or equal to the inner diameter $D_E$ of the enlarged pore portion 12 ($D_{C1} \leq D_E$). The first catalyst particles 20 with an average particle size $D_C$ within the above range are restricted from moving in the support 10. In this case, even when an external force is applied from a fluid to the first catalyst particles 20, the movement of the first catalyst particles 20 is restricted in the support 10, so that the first catalyst particles 20 dispersed in the support 10 are effectively prevented from coming into contact with one another or with the second catalyst particles 30 and thus effectively prevented from forming aggregates.

The average particle size $D_{C1}$ of the first catalyst particles 20 is preferably in the range of 1.0 nm or more and 13.0 nm or less, more preferably in the range of 1.0 nm or more and 9.0 nm or less, and even more preferably in the range of 1.0 nm or more and 4.5 nm or less. Carbon polymerization is less likely to occur on the first catalyst particles 20 with an average particle size $D_{C1}$ within the above range, which means that the coking described later is less likely to occur thereon and that they have further improved catalytic activity.

The ratio ($D_{C1}/D_F$) of the average particle size $D_{C1}$ of the first catalyst particles 20 to the average inner diameter $D_F$ of the channels 11 is preferably in the range of more than 1 and 130 or less, more preferably in the range of 1.1 or more and 90 or less, even more preferably in the range of 1.1 or more and 45 or less, and furthermore preferably in the range of 1.4 or more and 6.3 or less.

The average particle size $D_{C1}$ of the first catalyst particles 20 may be determined by a method that includes subjecting a cross-section of the catalyst structure 1 to small angle X-ray scattering (SANS) analysis and subjecting the resulting SAXS data to fitting by Guinier approximation using a spherical model. This method can also determine how the first catalyst particles 20 are dispersed in the catalyst structure 1. The SAXS measurement may be carried out, for example, using the beamline BL19B2 of Spring-8.

The content of the first catalyst particles 20 in the catalyst structure 1 is preferably in the range of 0.5% by mass or more and 3.5% by mass or less, more preferably in the range of 0.5% by mass or more and 2.5% by mass or less, and even more preferably in the range of 0.5% by mass or more and 1.5% by mass or less with respect to the mass of the catalyst structure 1 so that the catalyst structure 1 will have desired catalytic properties and be much less likely to suffer from coking. The content of the first catalyst particles 20 is calculated, for example, by the formula: {(the mass of the iron group element)/(the mass of all elements in the catalyst structure 1)}×100.

The ratio of the number of silicon (Si) atoms in the support 10 to the number of atoms of the iron group element ($M_1$) in the first catalyst particles 20 (atomic ratio $Si/M_1$) is preferably 10 to 1,000, more preferably 30 to 300, and even more preferably 50 to 200. An atomic ratio $Si/M_1$ of more than 1,000 may cause the catalytic activity to be low or insufficient for dry reforming. An atomic ratio $Si/M_1$ of less than 10 may mean an excessively high content of the first catalyst particles 20, which will tend to reduce the strength of the support 10. It should be noted that iron group element ($M_1$) atoms held or supported inside the support 10 should be counted and iron group element ($M_1$) atoms deposited on the outer surface 10a of the support 10 should not be counted when the atomic ratio $Si/M_1$ is determined.

During dry reforming, the first catalyst particle 20 acts to accelerate the reaction to convert a raw material gas including carbon dioxide and methane to a gas including carbon monoxide and hydrogen.

In general, dry reforming, which uses a raw material with a high carbon content, is more likely to suffer from carbon deposition on the catalyst surface than steam reforming in which methane reacts with water vapor. Thus, dry reforming is more likely to suffer from coking-induced problems, such as a decrease in catalytic activity due to carbon deposition and carbon deposition-induced clogging of a reaction tube that contains the catalyst structure 1. In particular, among the iron group elements: nickel (Ni), iron (Fe), and cobalt (Co), nickel (Ni) is naturally prone to coking since nickel (Ni), which is known for its high activity, catalyzes a larger amount of the raw material gas. Moreover, an increase in the activity of iron (Fe) or cobalt (Co) will increase the quantity of coking, although such quantity of coking is smaller than that on nickel (Ni) since iron (Fe) or cobalt (Co) has lower activity. Thus, the catalyst structure 1 including an iron group element needs to be less prone to coking in exchange for having high activity. In this regard, the catalyst structure 1 of the present invention includes a combination of the first catalyst particle 20 including an iron group element and the second catalyst particle 30 including a platinum group element described below so that it is highly active and less prone to coking.

Second Catalyst Particle

The second catalyst particle 30 includes at least one platinum group element selected from the group consisting of platinum (Pt), palladium (Pd), rhodium (Rh), and ruthenium (Ru). The second catalyst particle 30 alone is in the form of a fine particle. The second catalyst particle 30 present at least either inside the support 10 or on the outer surface of the support 10 allows hydrogen atoms produced during dry reforming to undergo spillover so that the hydrogen will undergo dissociative adsorption inside and outside the zeolite of the support 10 to prevent oxidation of the first catalyst particle 20 and thereby to allow the first catalyst particle 20 to maintain its catalytic activity for a longer period of time.

The second catalyst particle 30 may be a metal fine particle including a single elementary metal, a mixture of two or more metal elements, or a mixture of two or more metal elements at least partially forming an alloy. In particular, both of the first and second catalyst particles 20 and 30 are preferably metal fine particles. Before use, the second catalyst particle 30 may be a metal oxide fine particle including one or more metal oxides or a composite material of metal oxides.

In a case where the second catalyst particles 30 are present inside the support, they preferably have an average particle size $D_{C2}$ larger than the average inner diameter $D_F$ of the channels 11 ($D_{C2} > D_F$). The average particle size $D_{C2}$ of the second catalyst particles 30 present inside the support is also preferably smaller than or equal to the inner diameter $D_E$ of the enlarged pore portion 12 ($D_{C2} \leq D_E$). The second catalyst particles 30 with an average particle size $D_{C2}$ within the above range are restricted from moving in the support 10. In this case, even when an external force is applied from a fluid to the second catalyst particles 30, the movement of the second catalyst particles 30 is restricted in the support 10, so that the second catalyst particles 30 dispersed in the support 10 are effectively prevented from coming into contact with one another or with the first catalyst particles 20 and thus effectively prevented from forming aggregates.

In a case where second catalyst particles 30 are present inside the support 10, they preferably have an average particle size $D_{C2}$ in the range of 0.3 nm or more and 13.0 nm or less. The second catalyst particles 30 with such an average particle size are easy to incorporate into a precursor of the support 10 and thus can more stably produce the effect of preventing oxidation of the first catalyst particles 20.

In a case where the second catalyst particles 30 are present on the outer surface 10a of the support 10, they preferably have an average particle size $D_{C2'}$ in the range of 1 nm or more and 100 nm or less, more preferably in the range of 15 nm or more and 100 nm or less, even more preferably in the range of 30 nm or more and 100 nm or less, and most preferably in the range of 40 nm or more and 100 nm or less. The second catalyst particles 30 present on the outer surface 10a of the support 10 and preferably having a relatively large average particle size $D_{C2'}$ are less prone to sintering during dry reforming reaction and are more effective in allowing hydrogen atoms to undergo spillover and thus in preventing oxidation of the first catalyst particles 20. The second catalyst particles 30 present on the outer surface 10a of the support 10 and having a relatively large average particle size $D_{C2'}$ also allow the catalyst structure to have higher coking resistance.

The average particle size $D_{C2}$ of the second catalyst particles 30 present inside the support 10 may be determined, similar to the determination of the average particle size $D_{C1}$ of the first catalyst particles 20, by a method that includes subjecting a cross-section of the catalyst structure 1 to small angle X-ray scattering (SAXS) analysis and subjecting the resulting SAXS data to fitting by Guinier approximation using a spherical model. The average particle size $D_{C2'}$ of the second catalyst particles 30 present on the outer surface of the support 10 may be determined using a scanning electron microscope (SEM).

For adequate prevention of oxidation of the first catalyst particles 20, the content of the second catalyst particles 30 in the catalyst structure 1 is preferably 0.02% by mass or more, more preferably 0.10% by mass or more, and even more preferably 0.40% by mass or more with respect to the mass of the catalyst structure 1. The upper limit of the content of the second catalyst particles 30 in the catalyst structure 1 may be typically, but not limited to, 6.00% by mass. The content of the second catalyst particles 30 is calculated, for example, by the formula: {(the mass of the platinum group element)/(the mass of all elements in the catalyst structure 1)}×100.

The content of the platinum group element of the second catalyst particles 30 in the catalyst structure 1 is preferably lower than that of the iron group element of the first catalyst particles 20 in the catalyst structure 1. More specifically, the mass ratio of the content of the platinum group element of the second catalyst particles 30 to the content of the iron group element of the first catalyst particles 20 is preferably in the range of 0.05 or more and 3 or less, and more preferably in the range of 0.1 or more and 2.5 or less. Even with a relatively low content of the relatively expensive platinum group element, the catalyst structure 1 of the present invention will maintain high catalytic activity for a longer period of time.

The catalyst structure 1 may contain an additional element other than the iron and platinum group elements. Examples of the additional element include at least one metal element selected from the group consisting of metals belonging to groups 1, 2, 4, 7, and 12 of the periodic table. Among them, the additional element is preferably at least one metal element selected from the group consisting of potassium (K), magnesium (Mg), zirconium (Zr), manganese (Mn), and zinc (Zn). Such an additional element in the catalyst structure 1 can inhibit the formation of a silicate of the iron group element and thus can further contribute to the prevention of a decrease in catalytic activity. For the prevention of a decrease in catalytic activity due to a relative decrease in the content of the iron group element, the content of the additional element in the catalyst structure 1 is preferably 5% by mass or less with respect to the mass of the catalyst structure 1.

The second catalyst particle 30 may include, for example, zirconia ($ZrO_2$) in place of the platinum group element. The iron group metal can undergo oxidation induced by water ($H_2O$) molecules formed as a by-product of reverse shift reaction associated with dry reforming. Zirconia ($ZrO_2$), which has the ability to decompose water, is effective in preventing such oxidation of the iron group metal. Zirconia ($ZrO_2$) also has a high ability to adsorb carbon dioxide ($CO_2$), which is a substrate of dry reforming reaction, and thus is effective in improving the coking resistance of the catalyst structure 1.

Function of the Catalyst Structure

As mentioned above, the catalyst structure 1 includes: the support 10 having a porous structure; the first catalyst particles 20 that are present inside the support 10 and include an iron group element; and the second catalyst particles 30 that are present at least either inside the support 10 or on the outer surface of the support 10 and include a platinum group element.

Upon coming into contact with a fluid including methane and carbon dioxide, the first catalyst particles 20 present inside the support of the catalyst structure 1 exert their ability to catalyze the chemical reaction for dry reforming. Specifically, upon coming into contact with the outer surface 10a of the catalyst structure 1, the fluid is allowed to flow into the interior of the support 10 through a pore 11a at the outer surface 10a, guided into the channels 11, and allowed to pass through the channels 11 and to flow out of the catalyst structure 1 through another pore 11a. Upon coming into contact with the fluid passing through the channel 11, the first catalyst particle 20 present inside the channel 11 catalyzes the reaction. The catalyst structure 1 also has a molecular sieving ability since the support has a porous structure.

First, the molecular sieving ability of the catalyst structure 1 will be described with reference to FIG. 2A regarding an example in which a methane-containing gas and carbon dioxide are used as fluids. The term "methane-containing gas" refers to a gaseous mixture of methane and a gas other than methane. The methane-containing gas and carbon dioxide may be sequentially or simultaneously brought into contact with the catalytic structure 1.

Figure 2A:
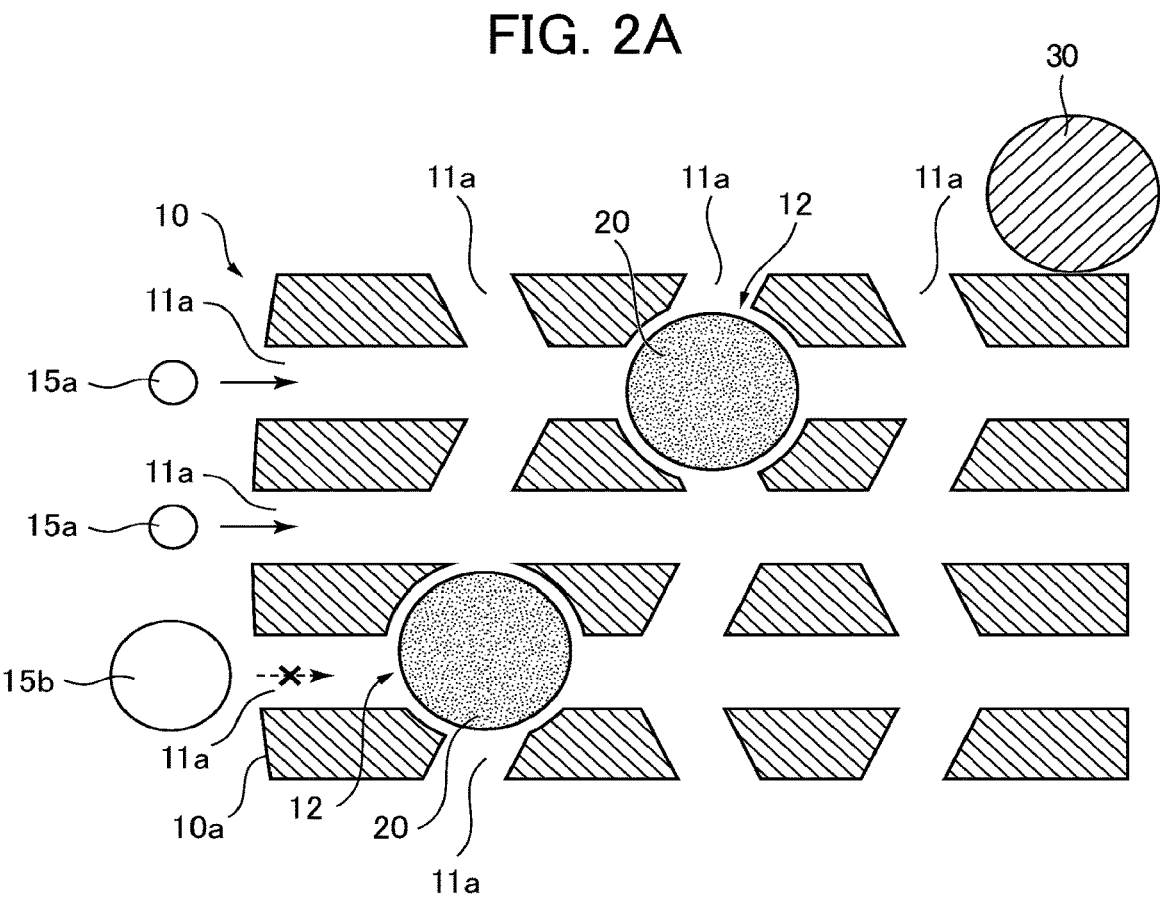

As shown in FIG. 2A, molecules 15a having a size smaller than or equal to the diameter of the pore 11a, in other words, smaller than or equal to the inner diameter of the channel 11, can enter the support 10. On the other hand, a molecule 15b having a size exceeding the diameter of the pore 11a cannot enter the support 10. Accordingly, among multiple compounds in the fluid, some compounds not capable of entering the support 10 are restricted from reacting, and some other compounds capable of entering the support 10 are allowed to react.

Among compounds produced by reactions in the support 10, only compounds having a molecular size not exceeding the diameter of the pore 11a can go outside the support 10 through the pore 11a to give a reaction product. On the other hand, some compounds are not capable of going outside the support 10 through the pore 11a. If such compounds are converted into compounds having a molecular size that allows exit from the support 10, the compounds can go outside the support 10. As a result, the use of the catalyst structure 1 makes it possible to selectively obtain a specific reaction product.

Figure 2B:
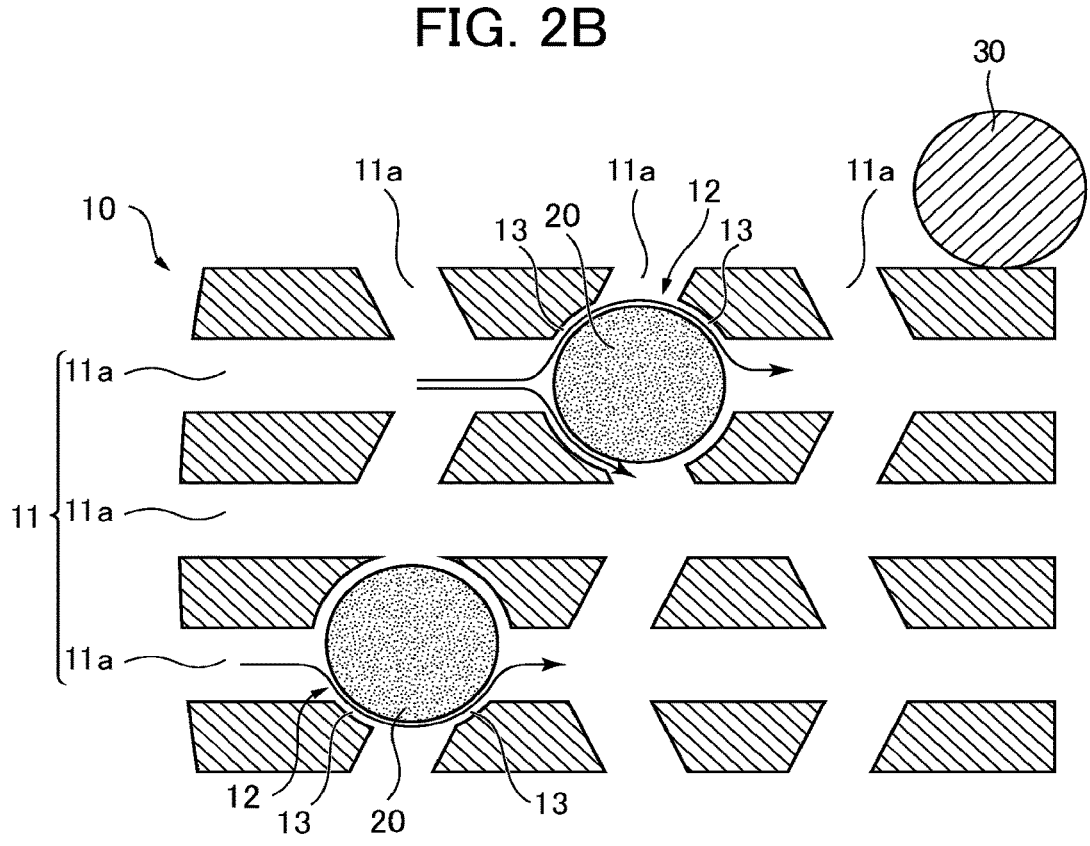

In the catalyst structure 1, the first catalyst particle 20 is enclosed in the enlarged pore portion 12 of the channel 11 as shown in FIG. 2B. When the average particle size $D_{C1}$ of the first catalyst particles 20 is larger than the average inner diameter $D_F$ of the channel 11 and smaller than the inner diameter $D_E$ of the enlarged pore portion 12 ($D_F < D_{C1} < D_E$), a small channel 13 is provided between the first catalyst particle 20 and the enlarged pore portion 12. In this case, as indicated by the arrow in FIG. 2B, the fluid entering the small channel 13 comes into contact with the first catalyst particle 20. The first catalyst particle 20 enclosed in the enlarged pore portion 12 is restricted from moving in the support 10. This prevents aggregation of the first fine catalyst particles 20 in the support 10. As a result, a large contact area will be stably maintained between the first catalyst particle 20 and the fluid.

Moreover, the catalyst structure 1 allows the second catalyst particles 30, which are present at least either inside the support or on the outer surface of the support, to cause spillover of hydrogen atoms being produced by the chemical reaction for dry reforming. Even if the iron group element, which has high catalytic activity when in a metallic state, undergoes oxidation, the spillover hydrogen atoms will promote the reduction of the oxide of the iron group element into the metallic state to prevent a decrease in catalytic activity due to oxidation of the first catalyst particles 20 including the iron group element.

In an embodiment, the catalyst structure 1 may be used to produce a syngas including carbon monoxide and hydrogen from a methane-containing gas and carbon dioxide as raw materials. The catalytic reaction (dry reforming reaction) may be carried out at a high temperature of, for example, 800° C. or more, during which the first catalyst particles 20 are less susceptible to the heating since they are present inside the support 10.

Specifically, the catalyst structure 1 according to the embodiment is preferably capable of exhibiting a $CH_4$ conversion rate of 60% or more when loaded in an atmospheric pressure flow reactor, supplied with a raw material gas with a $CH_4/CO_2$ volume ratio of 1.0, and used to perform a dry reforming reaction at 700° C. and a gas hourly space velocity (GHSV) of 320 $h^{-1}$ for 100 hours from the start of supply of the raw material gas. In this case, when used for the dry reforming reaction for syngas production, the catalyst structure will maintain a desired level of catalytic activity for a long period of time, such as 100 hours or more.

Figure 3A:
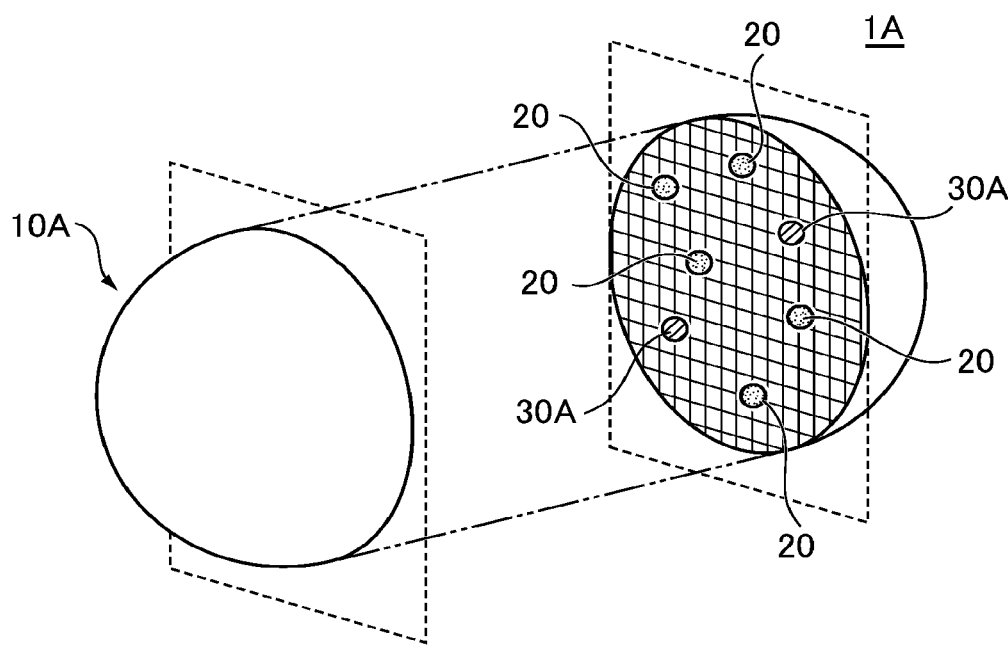
Figure 3B:
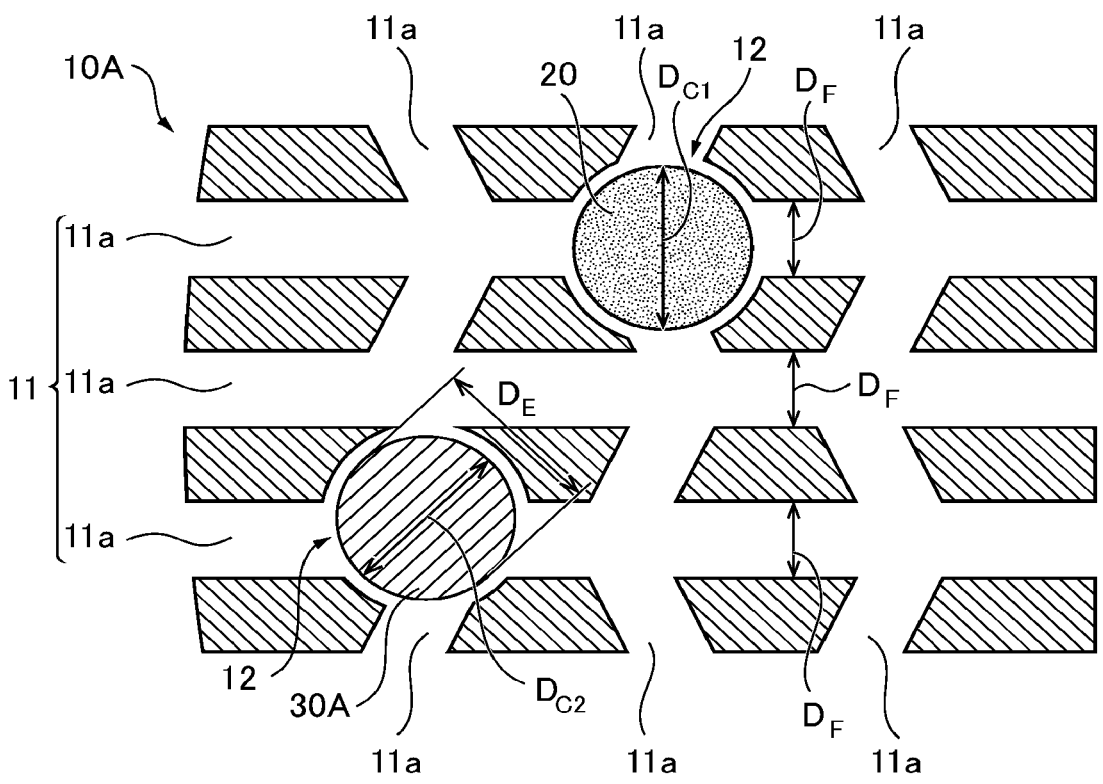

First Modification of the Catalyst Structure FIGS. 3A and 3B are schematic views of the inner structure of a catalyst structure according to a first modification of an embodiment of the present invention, in which FIG. 3A is a perspective view (partially cross-sectional), and FIG. 3B is a partially enlarged cross-sectional view. Hereinafter, some features of the catalyst structure, different from the features of the catalyst structure 1 of FIGS. 1A and 1B, will be mainly described while the same features will not be repeatedly described or will be briefly described using the same reference signs for the same elements in the drawings.

FIGS. 1A and 1B show the catalyst structure 1 having the second catalyst particles 30 present on the outer surface 10a of the support 10. This feature is non-limiting, and alternatively, FIGS. 3A and 3B show a catalyst structure 1A having second catalyst particles 30A present inside the support 10 and preferably having second catalyst particles 30A at least in channels 11 of the support 10. Namely, the catalytic structure 1A may have the first and second catalyst particles 20 and 30A both present in channels 11 of the support 10.

In particular, in a case where the channels 11 have any one selected from a one-dimensional pore, a two-dimensional pore, and a three-dimensional pore, which are defined by the framework structure of the zeolite-type compound, and have enlarged pore portions 12 different from all of the one-, two-, and three-dimensional pores, the first and second catalyst particles 20 and 30 are each preferably present in the enlarged pore portion 12 and more preferably enclosed in the enlarged pore portion 12.

This feature will restrict both the first and second catalyst particles 20 and 30A from moving in the support 10, effectively prevent aggregation of the first and second catalyst particles 20 and 30A, and effectively prevent separation of the first and second catalyst particles 20 and 30A from the support 10. This will effectively prevent a decrease in the effective surface area of the first and second catalyst particles 20 and 30A and allow the first and second catalyst particles 20 and 30A to maintain their catalytic activity for a long period of time. Accordingly, the catalyst structure 1A will be much less likely to suffer from aggregation of the catalyst fine particles 20 and thus much less prone to degradation of catalytic activity and will have a longer service life.

In this case, the average particle size $D_{C1}$ of the first catalyst particles 20 and the average particle size $D_{C2}$ of the second catalyst particles 30, which are present inside the support 10, are each preferably larger than the average inner diameter $D_F$ of the channels 11 ($D_{C1} > D_F$ and $D_{C2} > D_F$). Moreover, the average particle size $D_{C1}$ of the first catalyst particles 20 and the average particle size $D_{C2}$ of the second catalyst particles 30, which are present inside the support 10, are each preferably smaller than or equal to the inner diameter $D_E$ of the enlarged pore portion 12 ($D_{C1} \leq D_E$ and $D_{C2} \leq D_E$). With the average particle sizes $D_{C1}$ and $D_{C2}$ falling within the above ranges, the first and second catalyst particles 20 and 30 present inside the support 10 are restricted from moving in the support 10. Accordingly, the first and second catalyst particles 20 and 30 dispersed in the support 10 are effectively prevented from aggregating, so that the catalyst structure 1A will have a longer service life.

Figure 4:
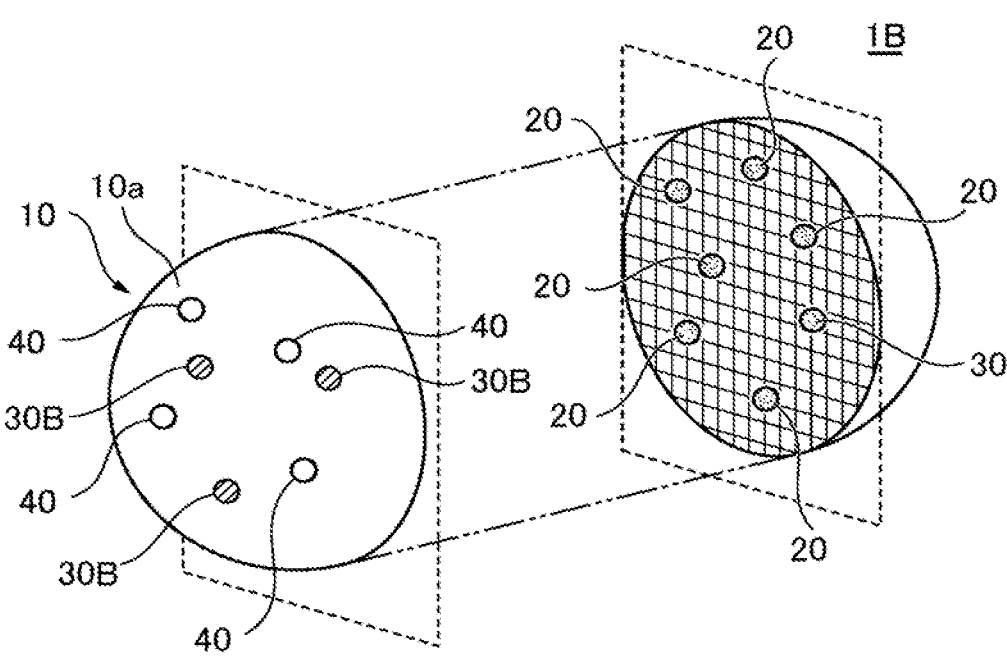
FIG. 4 is a schematic perspective view of the inner structure of a catalyst structure according to a second modification of an embodiment of the present invention.

In this case, the second catalyst particle 30 does not always have to be in direct contact with the support 10 and may be indirectly held by the support 10 with an additional material (e.g., a surfactant) provided between the second catalyst particle 30 and the support 10.
Second Modification of the Catalyst Structure FIG. 4 is a schematic persepctive view of the inner structure of a catalyst structure according to a second modification of an embodiment of the present invention. Hereinafter, some features of the catalyst structure, different from the features of the catalyst structure 1 of FIGS. 1A and 1B, will be mainly described while the same features will not be repeatedly described or will be briefly described using the same reference signs for the same elements in the drawings.

FIGS. 1A and 1B show the catalyst structure 1 having the first and second catalyst particles 20 and 30. This feature is non-limiting, and alternatively, FIG. 4 shows a catalyst structure 1B having at least one type of additional catalyst particles 40 held on the outer surface 10a of the support 10 in addition to the first and second catalyst particles 20 and 30. The additional catalyst particle 40 may include at least one iron group element selected from the group consisting of nickel (Ni), iron (Fe), and cobalt (Co) and may be in the form of a fine particle.

In the catalyst structure 1B of FIG. 4, the additional catalyst particle 40 has the ability to catalyze the chemical reaction for dry reforming and works together with the first catalyst particle 20 to further accelerate the dry reforming reaction.

In this case, the total content of the first and second catalyst particles 20 and 30 in the support 10 is preferably higher than the content of the additional catalyst particles 40 on the outer surface 10a of the support 10. In this case, the catalytic ability of the first catalyst particles 20 held inside the support 10 and the catalytic ability of the second catalyst particles 30 in the support 10 will be dominant, and the first and second catalyst particles 20 and 30 will stably exhibit their catalytic ability.

Figure 5:
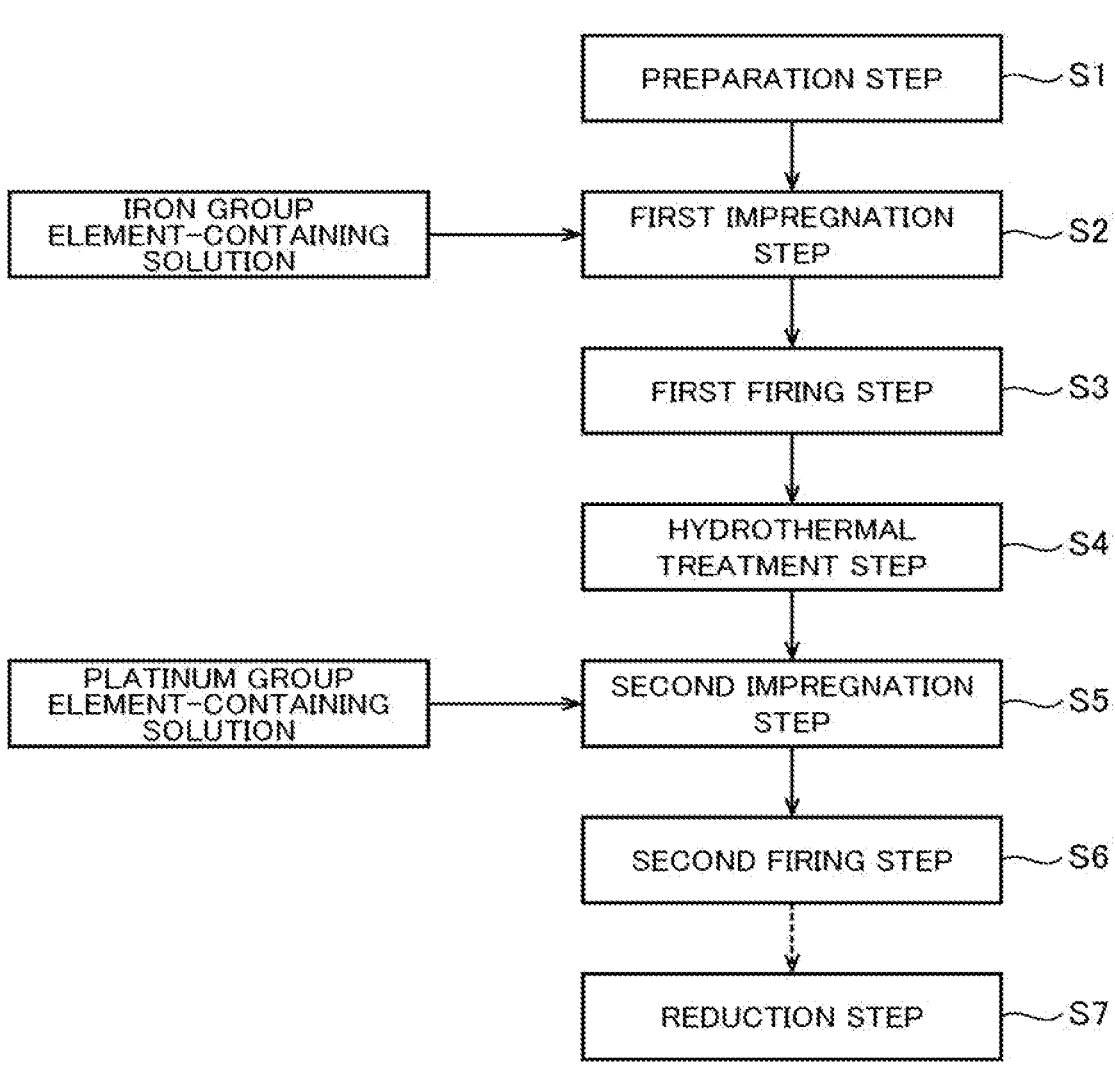
FIG. 5 is a flowchart showing an example of a method of producing the catalyst structure of FIGS. 1A and 1B.

The catalytic structure 1B preferably has second catalyst particles 30 present on the outer surface 10a of the support 10. Thus, the second catalyst particles 30 and the additional catalyst particles 40 are preferably present on the outer surface 10a of the support 10. In this case, the second catalyst particles 30 on the outer surface 10a of the support 10 will function to decompose coke (carbon polymer) generated on the additional catalyst particles 40 held on the outer surface 10a of the support 10 during dry reforming, which means that coking is less likely to occur even in a case where the additional catalyst particles 40 are provided on the outer surface 10a of the support 10.
Method of Producing the Catalyst Structure FIG. 5 is a flowchart showing an example of a method of producing the catalyst structure according to the present invention. Hereinafter, an example of a method of producing the catalyst structure will be described.
Step S1: Preparation Step As shown in FIG. 5, first, a precursor material (A) having pores with sizes of at most 13.0 nm is prepared, which is for obtaining a support having a porous structure and comprising a zeolite-type compound. The precursor material (A) is preferably an ordered mesoporous material, and may be appropriately selected depending on the type (composition) of the zeolite-type compound for obtaining the support of the catalyst structure.

In a case where a silicate compound is used as the zeolite-type compound for obtaining the support of the catalyst structure, the ordered mesoporous material is preferably a compound having an Si—O framework with pores regularly developed in a one-, two-, or three-dimensional pattern and with uniform pore sizes of at most 13.0 nm, more preferably 1.0 nm or more and 13.0 nm or less. A variety of synthetic products can be obtained as such ordered mesoporous materials depending on the synthesis conditions. Examples of such synthetic products include SBA-1, SBA-15, SBA-16, KIT-6, FSM-16, and MCM-41, among which MCM-41 is preferred.

For reference, SBA-1 has a pore size of 10 to 30 nm, SBA-15 has a pore size of 6 to 10 nm, SBA-16 has a pore size of 6 nm, KIT-6 has a pore size of 9 nm, FSM-16 has a pore size of 3 to 5 nm, and MCM-41 has a pore size of 1 to 10 nm. Examples of such an ordered mesoporous material include mesoporous silica, mesoporous aluminosilicate, and mesoporous metallosilicate.

The precursor material (A) may be a commercially available product or a product synthesized in the step. The precursor material (A) may be synthesized using a known method for synthesizing an ordered mesoporous material. For example, a mixture solution is prepared, which contains a raw material containing the element for forming the precursor material (A) and a template agent for directing the structure of the precursor material (A). Optionally after being subjected to pH adjustment, the mixture solution is subjected to hydrothermal treatment (hydrothermal synthesis). Subsequently, the precipitate (product) resulting from the hydrothermal treatment is collected (e.g., filtered off), optionally washed and dried, and then fired to give a precursor material (A) as a powdery ordered mesoporous material.

In this process, the solvent for the mixture solution may be, for example, water, an organic solvent such as an alcohol, or a mixed solvent thereof. The raw material may be selected depending on the type of the support. Examples of the raw material include silica agents, such as tetraethoxysilane (TEOS), fumed silica, and quartz sand. The template agent may be any of various surfactants and block copolymers. The template agent is preferably selected depending on the type of the ordered mesoporous material to be synthesized. For example, the template agent for use in forming MCM-41 is preferably a surfactant such as hexadecyltrimethylammonium bromide or tetraethylammonium hydroxide. Alternatively, the template agent may not be used. The hydrothermal treatment may be performed, for example, in a closed vessel under conditions at 80 to 800° C. and 0 to 2,000 kPa for 5 to 240 hours. The firing treatment may be performed, for example, in the air under conditions at 350 to 850° C. for 2 to 30 hours.

Step S2: First Impregnation Step

Next, the prepared precursor material (A) is impregnated with an iron group element-containing solution, which contains at least an iron group element, to form a precursor material (B).

The iron group element-containing solution contains at least one iron group element selected from the group consisting of nickel (Ni), iron (Fe), and cobalt (Co). The iron group element-containing solution may be any solution containing a metal component (e.g., metal ions) corresponding to the iron group element ($M_1$) for forming the first catalyst particles of the catalyst structure. For example, the iron group element-containing solution may be prepared by dissolving, in a solvent, a metal salt containing the iron group element ($M_1$). Examples of such a metal salt include chlorides, hydroxides, oxides, sulfates, and nitrates, among which chlorides or nitrates are preferred. The solvent may be, for example, water, an organic solvent such as an alcohol, or a mixed solvent thereof.

Any suitable method may be used to impregnate the precursor material (A) with the iron group element-containing solution. For example, before the first firing step (step S3) described later, the impregnation is preferably performed by adding the iron group element-containing solution little by little in multiple portions to the powdery precursor material (A) being stirred. For easier infiltration of the iron group element-containing solution into the inner pores of the precursor material (A), a surfactant is preferably added as an additive in advance before the addition of the iron group element-containing solution. Such an additive will act to cover the outer surface of the precursor material (A) and thus to inhibit the deposition of the iron group element-containing solution on the outer surface of the precursor material (A), so that the iron group element-containing solution added subsequently will more easily enter the pores of the precursor material (A).

Examples of such an additive include nonionic surfactants, such as polyoxyethylene oleyl ether, polyoxyethylene alkyl ether, and polyoxyethylene alkyl phenyl ether. These surfactants have a large molecular size and thus cannot enter the inner pores of the precursor material (A), which suggests that they will not adhere to the interior of the pores and will not hinder the entrance of the iron group element-containing solution into the pores. A method of adding the nonionic surfactant preferably includes, for example, adding 50 to 500% by mass of the nonionic surfactant to the precursor material (A) before the first firing step (step S3) described later. If added in an amount of less than 50% by mass with respect to the mass of the precursor material (A), the nonionic surfactant may be less effective for the inhibition. If added in an amount of more than 500% by mass with respect to the mass of the precursor material (A), the nonionic surfactant may provide an excessively high viscosity. Therefore, the amount of the nonionic surfactant added to the precursor material (A) should be set within the above range.

The amount of the iron group element-containing solution added to the precursor material (A) is preferably adjusted to a suitable level depending on the amount of the iron group element ($M_1$) in the iron group element-containing solution, with which the precursor material (A) is to be impregnated (in other words, the amount of the iron group element ($M_1$) to be incorporated into the precursor material (B)). For example, when the precursor material (A) is impregnated with the iron group element-containing solution before the first firing step (step S3) described later, the amount of the iron group element-containing solution added to the precursor material (A) is preferably adjusted such that the ratio (atomic ratio $Si/M_1$) of the number of silicon (Si) atoms in the precursor material (A) to the number of the iron group element ($M_1$) atoms in the iron group element-containing solution is set to 10 to 1,000, more preferably 50 to 200. For example, when a surfactant is added as an additive to the precursor material (A) before the addition of the iron group element-containing solution to the precursor material (A), the amount of the iron group element-containing solution added to the precursor material (A) may be adjusted such that the atomic ratio $Si/M_1$ will be 50 to 200. In such a case, the total content of the iron group element ($M_1$) forming the first catalyst particles will be adjusted to 0.5% by mass or more and 2.5% by mass or less with respect to the mass of the catalyst structure.

The content of the iron group element ($M_1$) in the pores of the precursor material (B) will be approximately proportional to the amount of the iron group element-containing solution added to the precursor material (A) as long as the metal concentration of the iron group element-containing solution, the presence or absence of the additive, and other conditions such as temperature and pressure remain constant. The amount of the iron group element ($M_1$) forming the first catalyst particles inside the support of the catalyst structure will also be proportional to the amount of the iron group element ($M_1$) in the precursor material (B). Accordingly, when the amount of the iron group element-containing solution added to the precursor material (A) is controlled within the above range, the inner pores of the precursor material (A) will be impregnated with a sufficient amount of the iron group element-containing solution, and the content of the first catalyst particles in the support of the catalyst structure will be adjusted accordingly.

If necessary, washing treatment may be performed after the impregnation of the precursor material (A) with the iron group element-containing solution. The washing liquid may be water, an organic solvent such as an alcohol, or a mixed solution thereof. Drying treatment is also preferably performed after the impregnation of the precursor material (A) with the iron group element-containing solution and optionally after the washing treatment. Drying treatment may include natural drying overnight or so or drying at a high temperature of 150° C. or less. The drying is preferably performed thoroughly. Otherwise, the precursor material (A) may contain a large amount of residual water derived from the iron group element-containing solution or the washing liquid, which may cause the framework structure of the precursor material (A) as an ordered mesoporous material to collapse during the firing treatment described later.

Step S3: First Firing Step

Next, the precursor material (B) is fired to form a precursor material (C). The precursor material (B) is the product obtained through impregnating, with the iron group element-containing solution, the precursor material (A) for obtaining the support having a porous structure and comprising the zeolite-type compound.

The first firing step (step S3) preferably includes firing, for example, under conditions at a temperature in a specific range for 2 to 30 hours in the air. The specific temperature range for the firing is preferably 350 to 850° C. and more preferably 500 to 850° C. Such firing treatment allows the growth of crystals of the metal component deposited by the impregnation in the pores of the ordered mesoporous material, so that metal fine particles and metal oxide fine particles form in the pores.

Step S4: Hydrothermal Treatment Step

Next, the precursor material (C), obtained through firing the precursor material (B), is hydrothermally treated to form a precursor material (D). More specifically, the precursor material (C), obtained through firing the precursor material (B), is preferably mixed with a structure-directing agent to form a mixture solution, which is then hydrothermally treated to form a precursor material (D).

The structure-directing agent is a template agent for directing the framework structure of the support of the catalyst structure. The structure-directing agent may be, for example, a surfactant. The structure-directing agent is preferably selected depending on the framework structure of the support of the catalyst structure, and preferred examples thereof include tetramethylammonium bromide (TMABr), tetraethylammonium bromide (TEABr), tetrapropylammonium bromide (TPABr), and other surfactants.

The precursor material (C) and the structure-directing agent may be mixed during or before the hydrothermal treatment step (step S4). Any method may be used to prepare the mixture solution. The precursor material (C), the structure-directing agent, and the solvent may be mixed at the same time, or the precursor material (C) and the structure-directing agent may be separately dispersed into individual solvents, and then the resulting dispersion solutions may be mixed. The solvent may be, for example, water, an organic solvent such as an alcohol, or a mixed solvent thereof. Before the hydrothermal treatment, the mixture solution is preferably subjected to pH adjustment using an acid or a base.

The hydrothermal treatment may be carried out using a known method, for example, which is preferably performed in a closed vessel under conditions at 80° C. to 200° C. and 0 to 2,000 kPa for 5 to 100 hours. The hydrothermal treatment is also preferably performed in a basic atmosphere. Although the reaction mechanism is not necessarily clear, the hydrothermal treatment using the precursor material (C) as a starting material can gradually destroy the framework structure of the precursor material (C) as an ordered mesoporous material but can form a new framework structure (porous structure) for the support of the catalyst structure based on the action of the structure-directing agent while substantially maintaining the positions of first catalyst particles in the pores of the precursor material (C). The resulting precursor material (D) includes: a support of a porous structure; and first catalyst particles that are present inside the support and include at least the iron group element, in which the support has channels connecting multiple pores derived from the porous structure, and at least some of the first catalyst particles are present in the channels of the support.

In this embodiment, the hydrothermal treatment step (step S4) includes: preparing a solution of a mixture of the precursor material (C) and the structure-directing agent; and hydrothermally treating the precursor material (C) in the mixture solution. This step is non-limiting, and alternatively, the precursor material (C) may be hydrothermally treated without being mixed with any structure-directing agent.

Preferably, the precipitate (precursor material (D)) resulting from the hydrothermal treatment is collected (e.g., filtered off) and then optionally washed, dried, and fired. The washing liquid may be water, an organic solvent such as an alcohol, or a mixed solution thereof. The drying may include natural drying overnight or so or drying at a high temperature of 150° C. or less. The drying is preferably performed thoroughly. Otherwise, the precipitate may contain a large amount of residual water, which may cause the framework structure for the support of the catalyst structure to collapse during the firing treatment. The firing treatment may be performed, for example, under conditions at 350 to 850° C. for 2 to 30 hours in the air. During such firing treatment, the structure-directing agent is burned away from the precursor material (D).

Step S5: Second Impregnation Step

Next, the precursor material (D) resulting from the hydrothermal treatment of the precursor material (C) is impregnated with a platinum group element-containing solution, which contains at least a platinum group element.

The platinum group element-containing solution contains at least one platinum group element selected from the group consisting of platinum (Pt), palladium (Pd), rhodium (Rh), and ruthenium (Ru). The platinum group element-containing solution may be any solution containing a metal component (e.g., metal ions) corresponding to the platinum group element ($M_2$) for forming the second catalyst particles of the catalyst structure. For example, the platinum group element-containing solution may be prepared by dissolving, in a solvent, a metal salt containing the platinum group element ($M_2$). Examples of such a metal salt include chlorides, hydroxides, oxides, sulfates, and nitrates, among which chlorides or nitrates are preferred. The solvent may be, for example, water, an organic solvent such as an alcohol, or a mixed solvent thereof.

Any suitable method may be used to impregnate the precursor material (D) with the platinum group element-containing solution. For example, before the second firing step (step S6) described later, the impregnation is preferably performed by adding the platinum group element-containing solution little by little in multiple portions to the powdery precursor material (D) being stirred. Similar to the first impregnation step (step S2), for easier infiltration of the platinum group element-containing solution into the inner pores of the precursor material (D), a surfactant may be added as an additive in advance before the addition of the platinum group element-containing solution to the precursor material (D).

The amount of the platinum group element-containing solution added to the precursor material (D) is also preferably adjusted to a suitable level depending on the amount of the platinum group element ($M_2$) in the platinum group element-containing solution, with which the precursor material (D) is to be impregnated. For example, when the precursor material (D) is impregnated with the platinum group element-containing solution before the second firing step (step S6) described later, the amount of the platinum group element-containing solution added to the precursor material (D) is preferably adjusted such that the ratio (atomic ratio Si/$M_2$) of the number of silicon (Si) atoms in the precursor material (D) to the number of the platinum group element ($M_2$) atoms in the platinum group element-containing solution is set to 10 to 1,000, more preferably 50 to 200. For example, when a surfactant is added as an additive to the precursor material (D) before the addition of the platinum group element-containing solution to the precursor material (D), the amount of the platinum group element-containing solution added to the precursor material (D) may be adjusted such that the atomic ratio Si/$M_2$ will be 50 to 200. In such a case, the total content of the platinum group element ($M_2$) forming the catalyst particles will be adjusted to 0.1% by mass or more and 2.0% by mass or less with respect to the mass of the catalyst structure.

The ratio (mass ratio $M_2$/$M_1$) of the content of the platinum group element ($M_2$) in the platinum group element-containing solution to the content of the iron group element ($M_1$) in the iron group element-containing solution is preferably in the range of 0.05 or more and 3 or less, more preferably in the range of 0.1 or more and 2.5 or less.

If necessary, washing treatment may be performed after the impregnation of the precursor material (D) with the platinum group element-containing solution. Drying treatment is also preferably performed after the impregnation of the precursor material (D) with the platinum group element-containing solution and optionally after the washing treatment. The conditions for the washing and drying treatments may be the same as those for the washing and drying treatments performed after the impregnation with the iron group element-containing solution.

Step S6: Second Firing Step

Next, the precursor material (D) impregnated with the platinum group element-containing solution is fired to form a catalyst structure.

The second firing step (step S6) preferably includes firing the precursor material (D), for example, under conditions at a temperature in a specific range for 2 to 30 hours in the air. The specific temperature range for the firing is preferably 350° C. to 850° C. and more preferably 500° C. to 850° C. Such firing treatment allows the growth of crystals of the platinum group element component deposited by the impregnation in the ordered mesoporous material or on the outer surface of the ordered mesoporous material, resulting in formation of second catalyst particles. The resulting catalyst structure includes: a support of a porous structure; first catalyst particles that are present inside the support and include at least the iron group element; and second catalyst particles that are present at least either inside the support or on the outer surface of the support and include at least the platinum group element, in which the support has channels connecting multiple pores derived from the porous structure, and at least some of the first catalyst particles are present in the channels of the support.

Step S7: Reduction Step

The method of producing the catalyst structure according to the embodiment preferably includes a reduction step (step S7) that includes subjecting the fired precursor material (D) to reduction treatment after the second firing step (step S6).

Specifically, in the method of producing the catalyst structure of the invention containing at least one iron group element ($M_1$) selected from Co, Fe, and Ni, the iron group element can undergo oxidation during the heat treatment in the steps (step S3 to S6) after the first impregnation step (step S2) for impregnation with the iron group element-containing solution, in particular, during the heat treatment in the hydrothermal treatment step (step S4). Thus, after the second firing step (step S6), the catalyst particles in the resulting support of the catalyst structure may include metal oxide fine particles composed mainly of an oxide of the iron group element. In order to obtain the catalyst structure including the first catalyst particles in the form of metal fine particles including the iron group element, the fired precursor material (D) resulting from the second firing step (step S6) should preferably be subjected to reduction treatment in a reducing gas atmosphere, such as hydrogen gas. The reduction treatment reduces the metal oxide fine particles into metal fine particles in the support, namely, reduces the metal oxide into elementary metal. The resulting catalyst structure has the first catalyst particles in the form of metal fine particles inside the support.

The reduction step (step S7) may be performed as needed. For example, the catalyst structure may be used at least temporarily in a reducing atmosphere environment. In such a case, when exposed to the usage environment containing the reducing atmosphere for a certain period of time, the metal oxide fine particles, if any, will undergo reduction, so that the resulting catalyst structure will be the same as that resulting from the above reduction treatment. In such a case, the precursor of the catalyst structure including at least one selected from the first and second catalyst particles in the form of metal oxide fine particles (catalyst particle precursors) may be used as it is.

Modification of the Method of Producing the Catalyst Structure

Figure 6:
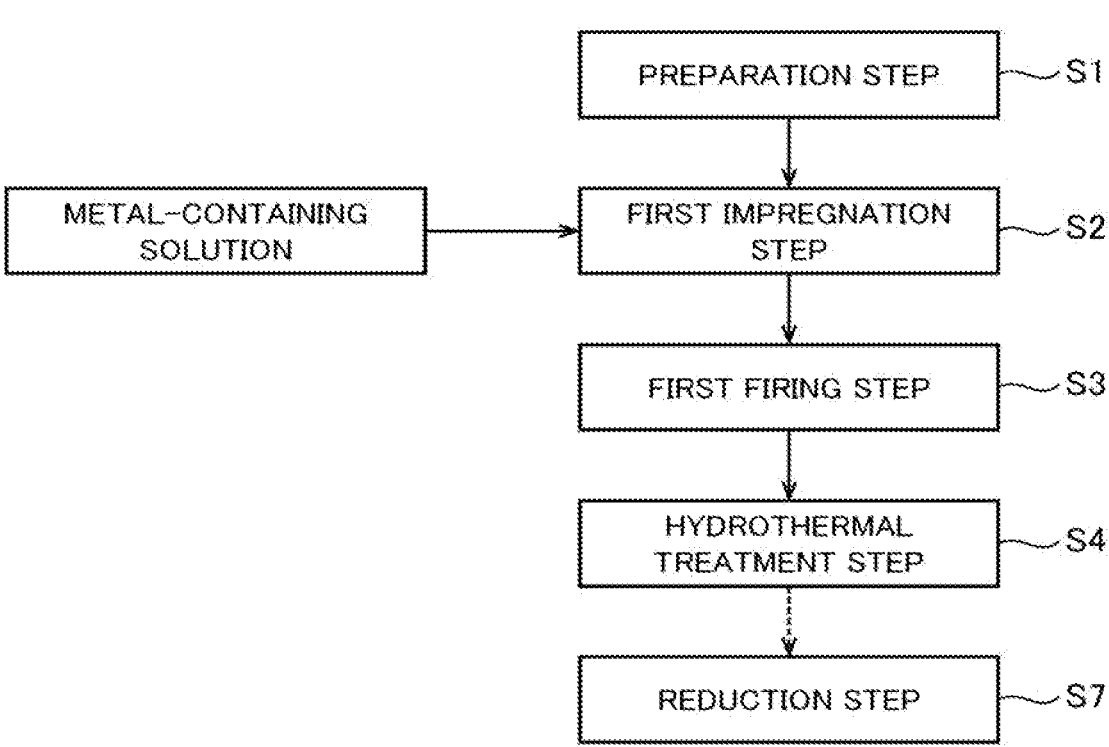
FIG. 6 is a flowchart showing a modification of the method of producing the catalyst structure of FIGS. 1A and 1B.

FIG. 6 is a flowchart showing a modification of the method of producing the catalyst structure according to the present invention. Hereinafter, some features of the catalyst structure production method, different from the features of the catalyst structure production method shown in the flowchart of FIG. 5, will be mainly described while the same features will not be repeatedly described or will be briefly described using the same reference signs for the same elements in the drawings.

FIG. 5 shows a non-limiting example of the method of producing the catalyst structure 1, including: a first impregnation step (step S2) that includes impregnating a precursor material (A) with an iron group element-containing solution; a first firing step (step S3) that includes firing a precursor material (B) resulting from the impregnation with the iron group element-containing solution; a hydrothermal treatment step (step S4) that includes hydrothermally treating a precursor material (C) resulting from the firing of the precursor material (B); a second impregnation step (step S5) that includes impregnating, with a platinum group element-containing solution, a precursor material (D) resulting from the hydrothermal treatment of the precursor material (C); and a second firing step (step S6) that includes firing a precursor material (D) resulting from the impregnation with the platinum group element-containing solution. Alternatively, for example, as shown in FIG. 6, the catalyst structure 1 is preferably produced by a method including: a first impregnation step (step S2) that includes impregnating a precursor material (A) with a metal-containing solution including an iron group element-containing solution and a platinum group element-containing solution to form a precursor material (B); a first firing step (step S3) that includes firing the precursor material (B), which has been impregnated with the metal-containing solution; and a hydrothermal treatment step (step S4) that includes hydrothermally treating a precursor material (C) resulting from the firing of the precursor material (B). This process simultaneously forms, inside the support 10, the first and second catalyst particles respectively including the iron and platinum group elements and thus is more efficient for producing the catalyst structure 1.

Step S2: First Impregnation Step

This step includes impregnating a precursor material (A) with a metal-containing solution to form a precursor material (B), in which the precursor material (A) is for obtaining a support and comprising a zeolite-type compound and having a porous structure, and the metal-containing solution contains an iron group element and a platinum group element.

The iron group element-containing solution contains at least one iron group element selected from the group consisting of nickel (Ni), iron (Fe), and cobalt (Co). The platinum group element-containing solution contains at least one platinum group element selected from the group consisting of platinum (Pt), palladium (Pd), rhodium (Rh), and ruthenium (Ru). The metal-containing solution may be any solution containing: a metal component corresponding to the iron group element ($M_1$) for forming the first catalyst particles; and another metal component corresponding to the platinum group element ($M_2$) for forming the second catalyst particles. For example, the metal-containing solution may be prepared by dissolving, in a solvent, a metal salt containing the iron group element ($M_1$) and another metal salt containing the platinum group element ($M_2$).

Any suitable method may be used to impregnate the precursor material (A) with the metal-containing solution. For example, before the first firing step (step S3) described later, the impregnation is preferably performed by adding the metal-containing solution little by little in multiple portions to the powdery precursor material (A) being stirred. For easier infiltration of the metal-containing solution into the inner pores of the precursor material (A), a surfactant is preferably added as an additive in advance before the addition of the metal-containing solution. Such an additive will act to cover the outer surface of the precursor material (A) and thus to inhibit the deposition of the metal-containing solution on the outer surface of the precursor material (A), so that the metal-containing solution added subsequently will more easily enter the pores of the precursor material (A).

The amount of the metal-containing solution added to the precursor material (A) is preferably adjusted to a suitable level depending on the amount of the iron and platinum group elements ($M_1$ and $M_2$) in the metal-containing solution, with which the precursor material (A) is to be impregnated (in other words, the amount of the iron and platinum group elements ($M_1$ and $M_2$) to be incorporated into the precursor material (B)). For example, when the precursor material (A) is impregnated with the metal-containing solution before the first firing step (step S3) described later, the amount of the metal-containing solution added to the precursor material (A) is preferably adjusted such that the ratio (atomic ratio $Si/M_1$) of the number of silicon (Si) atoms in the precursor material (A) to the number of the iron group element ($M_1$) atoms in the metal-containing solution is set to 10 to 1,000, more preferably 50 to 200. For example, when a surfactant is added as an additive to the precursor material (A) before the addition of the metal-containing solution to the precursor material (A), the amount of the metal-containing solution added to the precursor material (A) may be adjusted such that the atomic ratio $Si/M_1$ will be 50 to 200. In such a case, the total content of the iron group element ($M_1$) forming the first catalyst particles will be adjusted to 0.5% by mass or more and 2.5% by mass or less with respect to the mass of the catalyst structure.

Moreover, when the precursor material (A) is impregnated with the metal-containing solution before the first firing step (step S3), the amount of the metal-containing solution added to the precursor material (A) is preferably adjusted such that the ratio (atomic ratio $Si/M_2$) of the number of silicon (Si) atoms in the precursor material (A) to the number of the platinum group element ($M_2$) atoms in the metal-containing solution is set to 10 to 1,000, more preferably 50 to 200. For example, when a surfactant is added as an additive to the precursor material (A) before the addition of the metal-containing solution to the precursor material (A), the amount of the metal-containing solution added to the precursor material (A) may be adjusted such that the atomic ratio $Si/M_2$ will be 50 to 200. In such a case, the total content of the platinum group element ($M_2$) in the catalyst particles will be adjusted to 0.1% by mass or more and 2.0% by mass or less with respect to the mass of the catalyst structure.

The ratio (mass ratio $M_2/M_1$) of the content of the platinum group element ($M_2$) in the metal-containing solution to the content of the iron group element ($M_1$) in the metal-containing solution is preferably in the range of 0.05 or more and 3 or less, more preferably in the range of 0.1 or more and 2.5 or less.

The content of the iron group element ($M_1$) in the pores of the precursor material (B) will be approximately proportional to the amount of the metal-containing solution added to the precursor material (A) as long as the metal concentration of the metal-containing solution, the presence or absence of the additive, and other conditions such as temperature and pressure remain constant. The amount of the iron group element ($M_1$) forming the first catalyst particles inside the support of the catalyst structure will also be proportional to the amount of the iron group element ($M_1$) in the precursor material (B). Accordingly, when the amount of the metal-containing solution added to the precursor material (A) is controlled within the above range, the inner pores of the precursor material (A) will be impregnated with a sufficient amount of the metal-containing solution, and the content of the first and second catalyst particles in the support of the catalyst structure will be adjusted accordingly.

If necessary, washing treatment may be performed after the impregnation of the precursor material (A) with the metal-containing solution. Drying treatment is also preferably performed after the impregnation of the precursor material (A) with the metal-containing solution and optionally after the washing treatment.

Step S3: First Firing Step

Next, the precursor material (B) is fired to form a precursor material (C). The precursor material (B) is the product obtained by impregnating the precursor material (A) with the metal-containing solution containing the iron and platinum group elements.

The first firing step (step S3) preferably includes firing, for example, under conditions at a temperature in a specific range for 2 to 30 hours in the air. The specific temperature range for the firing is preferably 350 to 850° C. and more preferably 500 to 850° C. Such firing treatment allows the growth of crystals of the metal component deposited by the impregnation in the pores of the ordered mesoporous material, so that metal fine particles and metal oxide fine particles form in the pores from the metal-containing solution.

Step S4: Hydrothermal Treatment Step

Next, the precursor material (C), obtained through firing the precursor material (B), is hydrothermally treated to form a catalyst structure. More specifically, the precursor material (C), obtained through firing the precursor material (B), is preferably mixed with a structure-directing agent to form a mixture solution, which is then hydrothermally treated to form a catalyst structure.

The hydrothermal treatment may be carried out using a known method, for example, which is preferably performed in a closed vessel under conditions at 80° C. to 200° C. and 0 to 2,000 kPa for 5 to 100 hours. The hydrothermal treatment is also preferably performed in a basic atmosphere. The resulting catalyst structure includes: a support of a porous structure; first catalyst particles that are present inside the support and include at least the iron group element; and second catalyst particles that are present inside the support and include at least the platinum group element, in which the support has channels connecting multiple pores derived from the porous structure, and at least some of the first and second catalyst particles are present in the channels of the support.

Step S7: Reduction Step

The method of producing the catalyst structure according to the embodiment preferably includes a reduction step (step S7) that includes subjecting, to reduction treatment, the catalyst structure resulting from the hydrothermal step (step S4). The reduction treatment reduces metal oxide fine particles into metal fine particles in the support, namely, reduces the metal oxide into elementary metal. The resulting catalyst structure has the first catalyst particles in the form of metal fine particles inside the support.

The reduction step (step S7) may be performed as needed. For example, the catalyst structure may be used at least temporarily in a reducing atmosphere environment. In such a case, when exposed to the usage environment containing the reducing atmosphere for a certain period of time, the metal oxide fine particles, if any, will undergo reduction, so that the resulting catalyst structure will be the same as that resulting from the above reduction treatment.

Applications of the Catalyst Structure

In particular, the catalyst structure of the present invention is suitable for use in chemical reactions that potentially cause oxidation of the first catalyst particles or coke production (coking) and thus potentially cause a decrease in catalytic activity.

As an example of such application, a syngas production method is provided including carrying out dry reforming using the catalyst structure 1 of the present invention to synthesize carbon monoxide and hydrogen from methane and carbon dioxide. In this method, the catalyst structure 1 being used includes: the support 10 including a zeolite-type compound and having a porous structure; the first catalyst particles 20 that are present at least in channels 11 of the support 10 and include the iron group element; and the second catalyst particles 30 that are present at least either inside the support 10 or on the outer surface of the support 10 and include the platinum group element. Namely, the present invention provides a syngas production method that includes synthesizing carbon monoxide and hydrogen from methane and carbon dioxide using the catalyst structure 1 described above.

In this method, the catalyst structure is less prone to oxidation of the first catalyst particles 20, which would otherwise be induced by water produced by a side reaction of the chemical reaction for dry reforming, and less prone to a decrease in catalytic activity, which would otherwise be caused by the production of coke on the first catalyst particles 20.

The present invention may also provide a syngas production system including the catalyst structure or a precursor of the catalyst structure. Such a syngas production system may be any type capable of allowing dry reforming reaction to proceed using the catalyst structure described above. Such a syngas production system including the catalyst structure according to the present invention will also bring about advantageous effects as described above.

While catalyst structures for use in syngas production, syngas production systems, and methods of producing catalyst structures for use in syngas production have been described according to embodiments of the present invention, it will be understood that the embodiments are not intended to limit the present invention and may be altered or modified in various ways based on the technical idea of the present invention.

EXAMPLES

Examples 1 to 4

Synthesis of Precursor Material (A)

An aqueous solution of a mixture of a silica agent (tetraethoxysilane (TEOS) manufactured by Wako Pure Chemical Industries, Ltd.) and hexadecyltrimethylammonium bromide (CTAB) (manufactured by Wako Pure Chemical Industries, Ltd.) for serving as a template agent (structure-directing agent) was prepared, then subjected to pH adjustment as needed, and then hydrothermally treated in a closed vessel at 80 to 350° C. for 100 hours. Subsequently, the produced precipitate was filtered off, then washed with water and ethanol, and then fired in air at 600° C. for 24 hours to give a precursor material (A) of the type and pore size shown in Table 1 (preparation step (step S1)).

Preparation of Precursor Materials (B) and (C)

Next, nickel(II) nitrate hexahydrate (manufactured by Wako Pure Chemical Industries, Ltd.) (corresponding to a metal salt containing an iron group element) was dissolved in water to form an iron group element-containing solution.

The powdery precursor material (A) was pretreated by adding thereto an aqueous solution of polyoxyethylene (15) oleyl ether (NIKKOL BO-15V, manufactured by Nikko Chemicals Co., Ltd.) as an additive (nonionic surfactant). Subsequently, the powdery precursor material (A) was impregnated with the iron group element-containing aqueous solution by adding thereto the solution little by little in multiple portions (first impregnation step (step S2)). The precursor material (A) impregnated with the solution was then dried at room temperature (20° C.±10° C.) for at least 12 hours to give a precursor material (B).

In this process, the amount of the iron group element-containing aqueous solution added to the precursor material (A) was adjusted such that the ratio (atomic ratio $Si/M_1$) of the silicon (Si) content of the precursor material (A) to the iron group element ($M_1$) content of the iron group element-containing aqueous solution was 100.

Subsequently, the precursor material (B) resulting from the impregnation with the metal-containing aqueous solution was fired in air at 550° C. for 24 hours (first firing step (step S3)) to form a precursor material (C).

Preparation of Precursor Material (D)

An aqueous solution of a mixture of the resulting precursor material (C) and tetrapropylammonium bromide (TPABr) for serving as a structure-directing agent was prepared and then subjected to hydrothermal treatment in a closed vessel at 120° C. to 150° C. for 72 hours so that the precursor material (C) was hydrothermally treated (hydrothermal treatment step (step S4)).

Subsequently, the produced precipitate was filtered off, then washed with water, then dried at 100° C. for at least 12 hours, and then fired in air at 550° C. for 24 hours to form a precursor material (D).

Loading of Platinum Group Element into Precursor Material (D)

Next, a metal salt containing a platinum group element was selected depending on the type of the metal component of the second catalyst particles shown in Table 1 and dissolved in water to form a platinum group element-containing aqueous solution. In this case, one of the following metal salts was used.

Pt(NH$_3$)$_4$(NO$_3$)$_2$: Tetraammineplatinum(II) nitrate (manufactured by Sigma-Aldrich, product number: 278726)

H$_2$Cl$_6$Pt·6H$_2$O: Hexachloroplatinic (IV) acid hexahydrate (manufactured by FUJIFILM Wako Chemicals, product number: 089-05311)

The precursor material (D) was impregnated with the platinum group element-containing aqueous solution by adding thereto the solution little by little in multiple portions (second impregnation step (step S5)). In this way, the platinum group element was loaded into the precursor material (D). Subsequently, the precursor material (D) impregnated with the solution was dried at a temperature of 100° C. for 2 hours.

In the second impregnation step, the concentration of the platinum group element-containing aqueous solution and the amount of the platinum group element-containing aqueous solution added to the precursor material (D) were adjusted such that the load of the platinum group element (M$_2$) was in the range of 0.1% by mass or more and 2.0% by mass or less with respect to the mass of the catalyst structure.

Subsequently, the precursor material (D) impregnated with the platinum group element-containing aqueous solution was fired in air at 450° C. for 3 hours to form a catalyst structure (second firing step (step S6)) (Examples 1 to 4).

Example 5

In Example 5, nickel(II) nitrate hexahydrate (corresponding to a metal salt containing an iron group element) and tetraammineplatinum(II) nitrate (corresponding to a metal salt containing a platinum group element) were dissolved in water to form a metal-containing solution.

Subsequently, the powdery precursor material (A) pretreated as in Example 1 was impregnated with the metal-containing solution by adding thereto the solution little by little in multiple portions (first impregnation step (step S2)). The precursor material (A) impregnated with the solution was then dried at room temperature (20° C.±10° C.) for at least 12 hours to give a precursor material (B).

In this process, the amount of the metal-containing solution added to the precursor material (A) was adjusted such that the ratio (atomic ratio Si/M$_1$) of the silicon (Si) content of the precursor material (A) to the iron group element (M$_1$) content of the metal-containing aqueous solution was 100. The load of the platinum group element (M$_2$) was adjusted to fall within the range of 0.1% by mass or more and 2.0% by mass or less with respect to the mass of the catalyst structure.

Next, the precursor material (B) resulting from the impregnation with the metal-containing aqueous solution was fired in air at 550° C. for 24 hours (first firing step (step S3)) to form a precursor material (C).

An aqueous solution of a mixture of the resulting precursor material (C) and tetrapropylammonium bromide (TPABr) for serving as a structure-directing agent was prepared and then subjected to hydrothermal treatment in a closed vessel at 120° C. to 150° C. for 72 hours so that the precursor material (C) was hydrothermally treated (hydrothermal treatment step (step S4)).

Subsequently, the produced precipitate was filtered off, then washed with water, then dried at 100° C. for at least 12 hours, and then fired in air at 550° C. for 24 hours to form a catalyst structure.

Comparative Example 1

In Comparative Example 1, the precursor material (D) of Example 1 was used. Specifically, in Comparative Example 1, the precursor material (D) was used as a catalyst structure, which was a product obtained before the impregnation with the platinum group element-containing aqueous solution.

Comparative Examples 2 and 3

In Comparative Examples 2 and 3, only the second catalyst particles including the platinum group element were loaded onto commercially available MFI (ZSM-5)-type zeolite (manufactured by Tosoh Corporation, product number: 890HOA).

In this case, a metal salt containing a platinum group element was selected depending on the type of the metal component of the second catalyst particles shown in Table 1 and dissolved in water to form a platinum group element-containing aqueous solution. In this case, one of the following metal salts was used.

Pt(NH$_3$)$_4$(NO$_3$)$_2$: Tetraammineplatinum(II) nitrate (manufactured by Sigma-Aldrich, product number: 278726)

H$_2$Cl$_6$Pt·6H$_2$O: Hexachloroplatinic(IV) acid hexahydrate (manufactured by FUJIFILM Wako Chemicals, product number: 089-05311)

The commercially available zeolite was impregnated with the platinum group element-containing aqueous solution by adding thereto the solution little by little in multiple portions, so that the platinum group element was loaded onto the zeolite. The zeolite impregnated with the solution was then dried at a temperature of 100° C. for 2 hours.

In this process, the concentration of the platinum group element-containing aqueous solution and the amount of the platinum group element-containing aqueous solution added to the zeolite were adjusted such that the load of the platinum group element (M$_2$) was in the range of 0.1% by mass or more and 2.0% by mass or less with respect to the mass of the catalyst structure.

Subsequently, the zeolite impregnated with the platinum group element-containing aqueous solution was fired in air at 450° C. for 3 hours to form a catalyst structure.

Evaluations

The catalyst structures of Examples 1 to 5 and Comparative Example 1 were subjected to evaluations (A) to (G) shown below. Among them, Table 1 shows the results of evaluations (A) to (F).

(A) Structure of Support (Zeolite-Type Compound) and Average Inner Diameter of Channels The catalyst structures of the examples and the comparative example were evaluated for structural properties using an X-ray diffraction (XRD) analyzer (D8 ADVANCE manufactured by Bruker). As a result, each of the catalyst structures of the examples and the comparative example showed a peak pattern matching that of MFI-type zeolite registered in the powder X-ray diffraction database PDF-2 of The International Centre for Diffraction Data (ICDD).

(B) Location and Size of First Catalyst Particles

Samples for observation were prepared by grinding technique from the precursor materials (D) prepared in Examples 1 to 4 (samples resulting from the hydrothermal treatment step (step S4) in the course of the process), the catalyst structures prepared in Example 5 and Comparative Example 1, and the zeolite used in Comparative Examples 2 and 3. The cross-section of each of the samples was observed using a transmission electron microscope (TEM) (TITAN G2 manufactured by FEI Company). As a result, the catalyst structures of Examples 1 to 5 and Comparative Example 1 were observed to have a zeolite support and metal fine particles held inside the zeolite support.

The precursor materials (D) prepared in Examples 1 to 4 (samples resulting from the hydrothermal treatment step (step S4) in the course of the process), the catalyst structures prepared in Example 5 and Comparative Example 1, and the zeolite used in Comparative Examples 2 and 3 were subject to cross-section cutting using focused ion beam (FIB). The resulting cross-sections were subjected to elemental analysis using a scanning electron microscope (SEM) (SU8020 manufactured by Hitachi High Technologies Co., Ltd.) and an energy dispersive X-ray spectrometer (EDX) (X-Max manufactured by Horiba, Ltd.). As a result, nickel (Ni) (iron group element) was detected from the interior of the support in the catalyst structures of Examples 1 to 5 and Comparative Example 1. On the other hand, no iron group element was detected from the interior of the support in the catalyst structures of Comparative Examples 2 and 3. The results of the TEM cross-sectional observation and the SEM/EDX cross-sectional observation showed that the catalyst structures of the examples and Comparative Example 1 had nickel (Ni) fine particles (corresponding to the first catalyst particles including the iron group element) present inside the support.

The precursor materials (D) prepared in Examples 1 to 4 (samples resulting from the hydrothermal treatment step (step S4) in the course of the process), the catalyst structure prepared in Comparative Example 1, and the zeolite used in Examples 2 and 3 were subjected to small angle X-ray scattering (SAXS) analysis for determination of the average particle size and dispersed state of the first catalyst particles present inside the support. The SAXS measurement was carried out using the beamline BL19B2 of Spring-8. The resulting SAXS data were subjected to fitting by Guinier approximation using a spherical model to determine the average particle size $D_{C1}$ of the first catalyst particles. The results showed that the catalyst structures of Examples 1 to 4 and Comparative Example 1 had, inside the support, first catalyst particles with uniform sizes of 2 to 5 nm in an extremely highly dispersed state.

In addition to the first catalyst particles, the catalyst structure of Example 5 had second catalyst particles inside the support as shown later. The catalyst structure of Example 5 was not subjected to the measurement of the average particle size $D_{C1}$ of the first catalyst particles because it was difficult to distinguish between the first and second catalyst particles for the measurement of their sizes.

(C) Location and Size of Second Catalyst Particles

Using an SEM (SU8020 manufactured by Hitachi High Technologies Co., Ltd.), the catalyst structures of Examples 1 to 5 and Comparative Examples 2 and 3 were evaluated for whether they had second catalyst particles on the outer surface of the support and what average particle size $D_{C2}$, the second catalyst particles had. As a result, the catalyst structures of Examples 1 to 4 and Comparative Examples 2 and 3 were observed to have particles on the outer surface of the support. The particles on the outer surface of the support were subjected to elemental analysis using an EDX (X-Max manufactured by Horiba, Ltd.). As a result, platinum (Pt) (platinum group element) was detected from the particles on the outer surface of the support. As a result, the catalyst structures of Examples 1 to 4 and Comparative Examples 2 and 3 were observed to have second catalyst particles on the outer surface of the support. On the other hand, the catalyst structure of Example 5 was not observed to have any second catalyst particle on the outer surface of the support.

In the observed SEM image of each of the catalyst structures of Examples 1 to 4 and Comparative Examples 2 and 3, any 100 to 300 second particles on the outer surface of the support were selected and each measured for long and short dimeters. The measurements were averaged to calculate the diameter of each of the particles (N=100 to 300), and the calculated particle diameters were number-averaged to calculate the average particle size $D_{C2}$ of the second catalyst particles on the outer surface of the support. As a result, the catalyst structures of Examples 1 to 4 and Comparative Examples 2 and 3 were found to have, on the outer surface of the support, second catalyst particles with an average particle size $D_{C2}$ in the range of 10 nm or more and 50 nm or less.

As a result of the SEM/EDX cross-sectional observation of the catalyst structure of Example 5, platinum (Pt) (platinum group element) was detected from the interior of the support. Thus, the catalyst structure of Example 5 was found to have second catalyst particles inside the support.

The catalyst structure of Example 5 was not subjected to the measurement of the average particle size of the second catalyst particles because it was difficult to distinguish between the first and second catalyst particles for the measurement of their sizes.

(D) Content of First and Second Catalyst Particles in the Catalyst Structure

The catalyst structures of the examples and the comparative example were measured for iron and platinum group element contents (% by mass). The contents of iron and platinum group elements were quantified by inductively coupled plasma (ICP) analysis alone or a combination of ICP analysis and X-ray fluorescence (XRF) analysis. XRF analysis (using energy dispersive X-ray fluorescence analyzer SEA1200VX manufactured by SII Nanotechnology Inc.) was carried out in a vacuum atmosphere under conditions at an acceleration voltage of 15 kV (using a Cr filter) or an acceleration voltage of 50 kV (using a Pb filter). In XRF analysis method, the abundance of metals is determined from fluorescence intensity, and the metals cannot be quantified (in units of % by mass) by XRF analysis alone. Therefore, a combination of XRF analysis and ICP analysis was used to determine the contents of iron and platinum group elements in each of the catalyst structures of the examples and the comparative example.

(E) Evaluation of Catalyst Life

As an example, the life of the catalyst for dry reforming was evaluated under the conditions shown below to evaluate whether the catalyst maintained high activity for a long time.

The catalyst structure (140 mg) of each of the examples and the comparative example was charged into an atmospheric pressure flow reactor to form a catalyst layer, which was subjected to reduction treatment at 700° C. for 90 minutes with hydrogen gas being supplied.

Subsequently, while the temperature was maintained at 700° C., a mixed gas of carbon dioxide (5 mL/minute) and methane (5 mL/minute) ($CH_4/CO_2$ ratio=1.0) was supplied as a raw material gas at a gas hourly space velocity (GHSV) of 2,200 $h^{-1}$ to the catalyst structure so that a catalytic reaction (dry reforming reaction) was allowed to proceed for the time period shown in Table 1 using the catalyst structure. One hour after the start of the catalytic reaction, the flow rate of the syngas was measured at the outlet of the reactor, and the components of the collected syngas were analyzed using a hydrogen flame ionization detector (FID) (GC-14B (product name) manufactured by Shimadzu Corporation) and a thermal conductivity detector (TCD) (GC-8A (product name) manufactured by Shimadzu Corporation). The measured flow rate of the syngas and the results of the FID analysis and the TCD analysis were used to calculate the content of methane ($CH_4$) in the syngas, which was used to calculate the $CH_4$ conversion rate according to formula (I) below.

$$CH_4 \text{ conversion rate}(\%)=(\text{the } CH_4 \text{ content}(cm^3/h) \text{of the gas at the outlet/the } CH_4 \text{ content}(cm^3/h) \text{of the gas at the inlet})\times100 \qquad \text{Formula (I)}$$

For the catalyst structures of Examples 1 to 5 and Comparative Example 1, with which the dry reforming reaction was allowed to proceed, the calculation of the $CH_4$ conversion rate was continued after one hour elapsed from the start of the catalytic reaction, for the evaluation of the relationship between the $CH_4$ conversion rate (methane conversion rate) (%) and the time period (reaction time (h)) after the start of the catalytic reaction.

(F) Effect of Coking on Catalytic Reaction

The presence or absence of an adverse effect of coking on the catalytic reaction was evaluated over the time period shown in Table 1, for which the catalytic reaction (dry reforming reaction) was allowed to proceed using each of the catalyst structures of the examples and the comparative example.

During the time period, the case where the test was successfully continued with the reaction tube for the supply of the reactive gas not being clogged by coking was evaluated as good (O) (which means less coking (carbon deposition)), and the case where the supply of the raw material gas became impossible because of the clogging of the reaction tube by coking was evaluated as poor (x) (which means more coking).

(G) Accelerated Test on Catalyst Life

It is generally thought that during dry reforming reaction, coking becomes more likely to occur as the ratio ($CH_4/CO_2$ ratio) of the flow rate of methane to the flow rate of carbon dioxide in the raw material gas increases. Therefore, the durability (service life) of the catalyst structure was evaluated by carrying out an accelerated test in which the $CH_4/CO_2$ ratio was increased during the course of the catalytic reaction.

One g of the catalyst structure of Example 2 was charged into an atmospheric pressure flow reactor and then subjected to reduction treatment at 700° C. for 90 minutes with hydrogen gas being supplied.

Subsequently, while the temperature was maintained at 700° C., a mixed gas of carbon dioxide and methane was supplied at a gas hourly space velocity (GHSV) of 320 $h^{-1}$, which was lower than that in evaluation (E) shown above, to the catalyst structure so that a catalytic reaction (dry reforming reaction) was allowed to proceed using the catalyst structure. For 60 days from the start of the catalytic reaction, carbon dioxide and methane were each supplied at a rate of 5 mL/minute ($CH_4/CO_2$ ratio=1.0), and after the elapse of 60 days from the start of the reaction, the $CH_4/CO_2$ ratio was increased and carbon dioxide and methane were respectively supplied at rates of 4 and 6 mL/minute ($CH_4/CO_2$ ratio=1.5) during the reaction.

Every half to several days after the start of the catalytic reaction, the flow rate of the syngas was measured at the outlet of the reactor, and the components of the collected syngas were analyzed using a hydrogen flame ionization detector (FID) (GC-14B (product name) manufactured by Shimadzu Corporation) and a thermal conductivity detector (TCD) (GC-8A (product name) manufactured by Shimadzu Corporation). The measured flow rate of the syngas and the results of the FID analysis and the TCD analysis were used to calculate the content of methane ($CH_4$) in the syngas, which was used to calculate the $CH_4$ conversion rate according to formula (I) below.

$$CH_4 \text{ conversion rate}(\%)=(\text{the } CH_4 \text{ content}(cm^3/h) \text{of the gas at the outlet/the } CH_4 \text{ content}(cm^3/h) \text{of the gas at the inlet})\times100 \qquad \text{Formula (I)}$$

According to formula (II) below, the $CH_4$ equilibrium attainment rate was calculated from the resulting $CH_4$ conversion rate and the theoretically calculated $CH_4$ equilibrium conversion rate, which is approximately 73% at a $CH_4/CO_2$ ratio of 1.0 and approximately 59% at a $CH_4/CO_2$ ratio of 1.5.

$$CH_4 \text{ equilibrium attainment rate}(\%)=(CH_4 \text{ conversion rate}(\%)/CH_4 \text{ equilibrium conversion rate}(\%))\times100 \qquad \text{Formula (II)}$$

Figure 7:
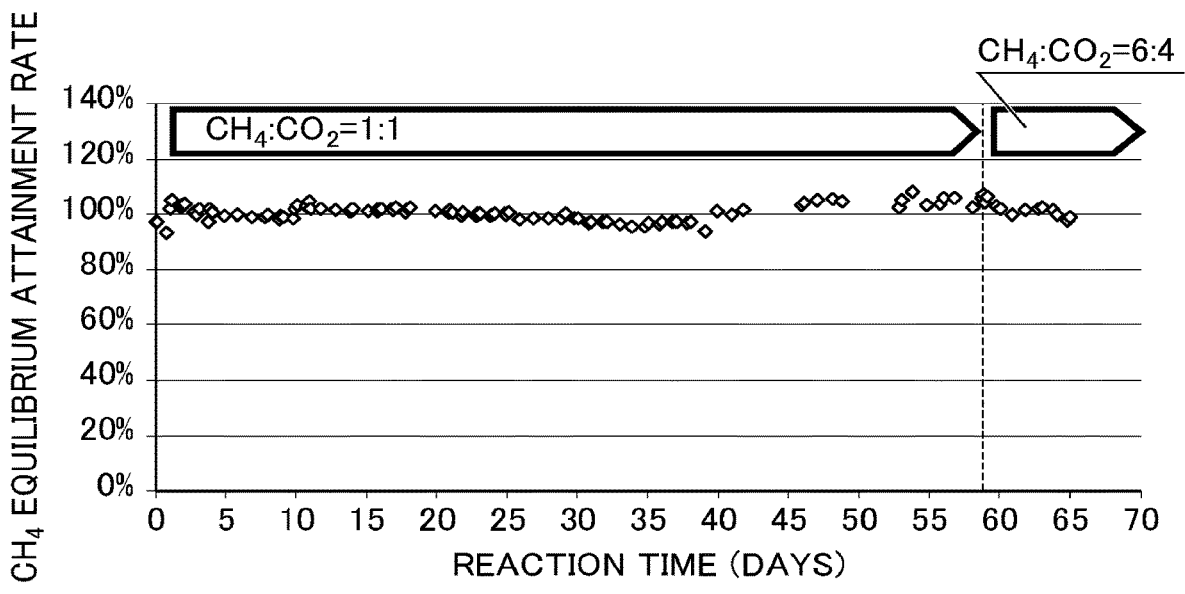
FIG. 7 is a graph showing the relationship between the $CH_4$ equilibrium attainment rate (%) of the catalyst structure of Example 2 and the number of days elapsed from the start of a catalytic reaction (the number of reaction days) in a case where 60 days after the start of the catalytic reaction, an accelerated test for durability was performed, in which the number of reaction days is on the horizontal axis and the $CH_4$ equilibrium attainment rate is on the vertical axis.

A graph was plotted with the number of days from the start of the catalytic reaction (the number of reaction days) on the horizontal axis and the $CH_4$ equilibrium attainment rate (%) on the vertical axis to show the relationship between them. The resulting graph is shown in FIG. 7.

TABLE 1

| | Catalyst structure | | | | | | | | |
|---|---|---|---|---|---|---|---|---|---|
| | (A) Structure of support and average inner diameter of channels | | Metal species in first and second catalyst particles | | (B) & (C) Location and size of first and second catalyst particles | | | | (D) Contents of first and second catalyst particles |
| | Structure | Average inner diameter (D_F) of whole channels | First catalyst particles | Second catalyst particles (raw material for second metal) | Location of first catalyst particles | Average size (D_c1) of first catalyst particles | Location of second catalyst particles | Average size (D_c2) of second catalyst particles on support surface | First catalyst particles (M_1) |
| Analysis method | XRD/TEM | XRD/TEM | — | — | Cross-sectional TEM/cross-sectional EDX | SAXS | SEM | SEM | ICP/XRF |
| Units | — | nm | — | — | — | nm | — | nm | % by mass |
| Example 1 | MFI | 0.56 | Ni | Pt (Pt(NH$_3$)$_4$(NO$_3$)$_2$) | Support interior | 2.5 | Support surface | 41 | 1.4 |
| Example 2 | | | | | | 2.5 | | 47 | 0.81 |
| Example 3 | | | | | | 2.5 | | 15 | 1.4 |
| Example 4 | | | | Pt (H$_2$Cl$_6$Pt•6H$_2$O) | | 2.5 | | 13 | 0.73 |
| Example 5 | | | | Pt (Pt(NH$_3$)$_4$(NO$_3$)$_2$) | | — | Support interior | — | 0.64 |
| Comparative Example 1 | MFI | 0.56 | Ni | Absent | Support interior | 2.5 | Absent | Absent | 3.1 |
| Comparative Example 2 | | | Absent | Pt (Pt(NH$_3$)$_4$(NO$_3$)$_2$) | Absent | Absent | Support surface | 43 | Absent |
| Comparative Example 3 | | | | Pt (H$_2$Cl$_6$Pt•6H$_2$O) | | Absent | | 11 | Absent |

| | Catalyst structure | | | Evaluation of catalyst structure performance | | | |
|---|---|---|---|---|---|---|---|
| | (D) Contents of first and second catalyst particles | | Ratio (D_c1/D_F) of the average size (D_c1) of first catalyst particles to the average inner diameter (D_F) of channels | (E) Catalyst life | | (F) Effect of coking on catalytic reaction | |
| | Second catalyst particles (M_2) | Ratio (M_2/M_1) of the content of second catalyst particles to the content of first catalyst particles | | Initial methane conversion rate (elapsed time (h)) | Methane conversion rate (elapsed time (h)) after approximately 1 day | Reaction time | Evaluation |
| Analysis method | ICP/XRF | — | — | | | | — |
| Units | % by mass | — | — | % | % | h | — |
| Example 1 | 1.9 | 1.4 | 4.5 | 73 (1 h) | 75 (24 h) | 1370 | ○ |
| Example 2 | 0.49 | 0.6 | 4.5 | 69 (1 h) | 69 (24 h) | 1560 | ○ |
| Example 3 | 0.16 | 0.1 | 4.5 | 73 (1 h) | 75 (25 h) | 77 | ○ |
| Example 4 | 0.41 | 0.6 | 4.5 | 73 (1 h) | 75 (24 h) | 350 | ○ |
| Example 5 | 1.6 | 2.5 | — | 67 (1 h) | 68 (24 h) | 172 | ○ |
| Comparative Example 1 | Absent | Absent | 4.5 | 73 (1 h) | 27 (24 h) | 48 | ○ |
| Comparative Example 2 | 1.3 | Absent | Absent | 0 (1 h) | — | 1 | — |
| Comparative Example 3 | 0.73 | Absent | Absent | 0 (1 h) | — | 1 | — |

Note:
Results outside the scope of the present invention are indicated by the underlined bold word in the table.
In the table, the sign "—" means that the item was not evaluated.

The results in Table 1 show the following points. The cross-sectional observation revealed that the catalyst structures (Examples 1 to 5) had first catalyst particles including an iron group element located inside the support and second catalyst particles including a platinum group element located inside the support or on the outer surface of the support. The catalyst structures (Examples 1 to 5) with such features exhibited high catalytic activity at the initial stage of the dry reforming reaction as compared to the catalyst structures (Comparative Examples 2 and 3) having no first catalyst particle inside the support. The catalyst structures prepared of Example 2 had second catalyst particles with an average particle size of 47 nm while the catalyst structure of Example 4 had second catalyst particles with an average particle size of 13 nm. This difference suggests that a reduction in the size of the second metal particles may induce coking. It is also suggested that the second metal particles should preferably have a size of at least 40 nm in order to maintain the catalytic activity for a long period of time.

TABLE 2

| | Average size (nm) of first catalyst particles | Average size (nm) of second catalyst particles | Content (% by mass) of first catalyst particles in catalyst structure | Content (% by mass) of second catalyst particles in catalyst structure | Amount (% by mass) of coke production |
|---|---|---|---|---|---|
| Example 2 | 2.5 | 47 | 0.81 | 0.49 | 0.4 to 5.0 |
| Example 4 | 2.5 | 13 | 0.73 | 0.41 | 7.0 to 15.0 | in Examples 1 to 5 were also found to exhibit high catalytic activity after approximately 1 day from the start of the catalytic reaction and thus to have a high ability to maintain the catalytic activity as compared to the catalyst structure (Comparative Example 1) having no second catalyst particle inside the support or on the outer surface of the support.

The catalyst structures of Examples 1 to 5 were also found to suffer from less coking during the dry reforming reaction and thus to have high catalytic durability. On the other hand, the catalyst structure of Comparative Example 1, although it suffered from less coking, showed a decrease in methane conversion rate in a shorter time than the catalyst structures of Examples 1 to 5. This suggests that the catalyst structures of Examples 1 to 5 should have an ability to prevent a decrease in catalytic activity due to causes other than coking so that they can maintain high catalytic activity for a longer period of time as compared to the catalyst structure of Comparative Example 1.

Furthermore, the catalyst structure prepared in Example 2 was found to have a high $CH_4$ equilibrium attainment rate even after 65 days from the start of the catalytic reaction in the accelerated test using a raw material gas with an increased $CH_4/CO_2$ ratio and thus to have particularly high catalytic durability.

The results suggest that the catalyst structures of Examples 1 to 4 are effective for efficient production of a syngas including carbon monoxide and hydrogen and have the ability to maintain high catalytic activity for a longer period of time.

In evaluation (F) of the effect of coking on catalytic reaction, whether the reaction test was able to be continued for the time period shown in Table 1 was determined to evaluate the result as "good" (O). This does not eliminate the possibility of a small quantity of coking. Coking, if it occurs, may affect the maintenance of catalytic activity for a longer period of time. In order to predict whether the catalytic activity can be maintained for a long period of time, therefore, the amount of coke produced in each of the examples was analyzed in more detail. The results are shown in Table 2. There was a significant difference between the amount of coke produced in the catalyst structure of Example 2 and that in the catalyst structure of Example 4. The catalyst structure

EXPLANATION OF REFERENCE NUMERALS

1: Catalyst structure for use in syngas production
10: Support
10a: Outer surface of support
11: Channel
11a: Pore of support
12: Enlarged pore portion
20: First catalyst particle
30: Second catalyst particle
40: Additional catalyst particle
$D_{C1}$: Average size of first catalyst particles 20
$D_{C2}$: Average size of second catalyst particles 30 inside the support
$D_{C2'}$: Average size of second catalyst particles 30 on the outer surface of the support
$D_F$: Average inner diameter of channels
$D_E$: Inner diameter of enlarged pore portion

The invention claimed is:
1. A syngas production catalyst structure for use in production of a syngas comprising carbon monoxide and hydrogen, the syngas production catalyst structure comprising:

a support comprising a zeolite compound and having a porous structure;

first catalyst particles comprising at least one iron group element selected from the group consisting of nickel (Ni), iron (Fe), and cobalt (Co); and second catalyst particles comprising at least one platinum group element selected from the group consisting of platinum (Pt), palladium (Pd), rhodium (Rh), and ruthenium (Ru), wherein the support has, in its interior, channels communicating with one another, the first catalyst particles are present at least in the channels of the support, the second catalyst particles are present at least either inside the support or on an outer surface of the support, and the first catalyst particles have an average particle size larger than an average inner diameter of the channels.

2. The syngas production catalyst structure according to claim 1, wherein the at least one iron group element is nickel (Ni).

3. The syngas production catalyst structure according to claim 1, wherein a total content of the first catalyst particles is 0.5% by mass or more and 3.5% by mass or less with respect to a mass of the syngas production catalyst structure.

4. The syngas production catalyst structure according to claim 1, wherein the first catalyst particles have an average particle size in a range of 1.0 nm or more and 13.0 nm or less.

5. The syngas production catalyst structure according to claim 1, wherein a ratio of an average particle size of the first catalyst particles to the average inner diameter of the channels is in a range of more than 1 and 130 or less.

6. The syngas production catalyst structure according to claim 1, wherein a total content of the second catalyst particles is 0.02% by mass or more and 6.00% by mass or less with respect to a mass of the syngas production catalyst structure.

7. The syngas production catalyst structure according to claim 1, wherein the second catalyst particles are present on the outer surface of the support, and the second catalyst particles present on the outer surface of the support have an average particles size in a range of 1 nm or more and 100 nm or less.

8. The syngas production catalyst structure according to claim 1, wherein the second catalyst particles are present inside the support, and the second catalyst particles present inside the support have an average particle size larger than the average inner diameter of the channels.

9. The syngas production catalyst structure according to claim 1, wherein the second catalyst particles are present inside the support, and the second catalyst particles present inside the support have an average particle size in a range of 0.3 nm or more and 13.0 nm or less.

10. The syngas production catalyst structure according to claim 1, wherein the channels have: any one selected from a one-dimensional pore, a two-dimensional pore, and a three-dimensional pore of a framework structure of the zeolite compound; and enlarged pore portions different from all of the one-, two-, and three-dimensional pores, and among the first and second catalyst particles, at least the first catalyst particles are present in the enlarged pore portions.

11. The syngas production catalyst structure according to claim 10, wherein the first and second catalyst particles are present in the enlarged pore portions.

12. The syngas production catalyst structure according to claim 10, wherein the enlarged pore portions connect a plurality of pores constituting one selected from the one-, two-, and three-dimensional pores.

13. The syngas production catalyst structure according to claim 10, wherein the first and second catalyst particles present inside the support have an average particle size smaller than or equal to inner diameters of the enlarged pore portions.

14. The syngas production catalyst structure according to claim 10, wherein all of the first and second catalyst particles are metal fine particles.

15. The syngas production catalyst structure according to claim 1, further comprising at least one type of additional catalyst particles that are other than the first and second catalyst particles and supported on the outer surface of the support.

16. The syngas production catalyst structure according to claim 15, wherein a total content of the first and second catalyst particles present inside the support is higher than that of the additional catalyst particles.

17. The syngas production catalyst structure according to claim 1, wherein the zeolite compound is a silicate compound.

18. The syngas production catalyst structure according to claim 1, wherein the syngas production catalyst structure is capable of exhibiting a $CH_4$ conversion rate of 60% or more when loaded in an atmospheric pressure flow reactor, supplied with a raw material gas with a $CH_4/CO_2$ volume ratio of 1.0, and used to perform a dry reforming reaction at 700° C. and a gas hourly space velocity (GHSV) of 320 $h^{-1}$ for 100 hours from start of supply of the raw material gas.

19. The syngas production catalyst structure according to claim 1, wherein the zeolite compound is at least one selected from the group consisting of MTW type, MFI type, FER type, LTA type (Linde Type A), MOR type, and LTL type (Linde Type L).

20. A syngas production system comprising the syngas production catalyst structure according to claim 1.

* * * * *